US006892940B2

(12) United States Patent
Kocarev et al.

(10) Patent No.: US 6,892,940 B2
(45) Date of Patent: May 17, 2005

(54) ENCRYPTION PROCESS EMPLOYING CHAOTIC MAPS AND DIGITAL SIGNATURE PROCESS

(75) Inventors: Ljupco Kocarev, San Diego, CA (US); Zarko Tasev, San Diego, CA (US); Paolo Amato, Limbiate (IT); Gianguido Rizzotto, Civate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/818,695

(22) Filed: Apr. 6, 2004

(65) Prior Publication Data

US 2004/0223616 A1 Nov. 11, 2004

(30) Foreign Application Priority Data

Apr. 7, 2003 (EP) .......................................... 03425219

(51) Int. Cl.[7] ................................................ G06K 5/00
(52) U.S. Cl. ......................... 235/380; 380/28; 380/263
(58) Field of Search ..................... 235/379, 382–382.5, 235/383; 705/41–44; 340/5.52–5.53, 5.8–5.83; 902/3–5, 2; 382/115–116; 380/259, 285, 44, 263, 28; 713/200, 201

(56) References Cited

U.S. PATENT DOCUMENTS

| | | | | |
|---|---|---|---|---|
| 4,636,622 A | * | 1/1987 | Clark ........................... | 235/380 |
| 5,354,974 A | * | 10/1994 | Eisenberg .................... | 235/379 |
| 5,479,513 A | * | 12/1995 | Protopopescu et al. ....... | 380/28 |
| 5,610,688 A | * | 3/1997 | Inamoto et al. ............. | 399/366 |
| 5,680,462 A | * | 10/1997 | Miller et al. ................ | 380/263 |
| 5,850,076 A | * | 12/1998 | Morioka et al. ............ | 235/379 |
| 5,869,822 A | * | 2/1999 | Meadows et al. ........... | 235/380 |
| 5,930,364 A | * | 7/1999 | Kim ............................ | 380/28 |
| 6,014,455 A | * | 1/2000 | Sumiyoshi et al. .......... | 382/144 |
| 6,049,614 A | * | 4/2000 | Kim ............................ | 380/263 |
| 6,064,738 A | * | 5/2000 | Fridrich ....................... | 380/28 |
| 6,094,483 A | * | 7/2000 | Fridrich et al. .............. | 380/28 |
| 6,193,152 B1 | * | 2/2001 | Fernando et al. ........... | 235/380 |
| 6,263,146 B1 | * | 7/2001 | Umeno et al. .............. | 385/147 |
| 6,266,647 B1 | * | 7/2001 | Fernandez ................... | 705/14 |
| 6,270,011 B1 | * | 8/2001 | Gottfried .................... | 235/379 |
| 6,661,831 B1 | * | 12/2003 | Umeno ....................... | 375/142 |
| 6,792,111 B1 | * | 9/2004 | Italia et al. ................. | 380/263 |
| 6,793,134 B2 | * | 9/2004 | Clark ......................... | 235/379 |
| 2001/0029488 A1 | * | 10/2001 | Takeshima et al. .......... | 705/41 |
| 2002/0076044 A1 | * | 6/2002 | Pires .......................... | 380/37 |

FOREIGN PATENT DOCUMENTS

| | | | | |
|---|---|---|---|---|
| EP | 994598 A1 | * | 4/2000 | ............ H04L/9/00 |
| JP | 06266954 A | * | 9/1994 | ............ G07G/1/00 |
| JP | 10171573 A | * | 6/1998 | ............ G06F/3/02 |
| JP | 11194892 A | * | 7/1999 | ............ G06F/3/033 |
| WO | 98/36523 | | 8/1998 | ............ H04L/9/00 |

OTHER PUBLICATIONS

Papadimitriou et al., Secure Communication Protocols with Discrete Nonlinear Chaotic Maps, Journal of Systems Architecture, Elsevier Science Publishers BV, Amsterdam, NL, vol. 47, No. 1, Jan. 2001, pp. 61–72.

Shamir, On the Power of Commutativity in Cryptography, Automata, Languages and Programming International Colloquium Proceedings, Jul. 14, 1980, pp. 582–595, XP002116401.

Kocarev et al., From Chaotic Maps to Encryption Schemes, ISCAS '98, Proceedings of the 1998 IEEE International Symposium on Circuits and Systems, Monterey, CA, USA, May 31–Jun. 3, 1998, New York, NY, USA, IEEE, May 31, 1998, pp. 514–517, XP010289462.

* cited by examiner

*Primary Examiner*—Michael G. Lee
*Assistant Examiner*—Uyen-Chay N. Le
(74) *Attorney, Agent, or Firm*—Lisa K. Jorgenson; Allen, Dyer, Doppelt, Milbrath & Gilchrist, P.A.

(57) ABSTRACT

An encryption process includes choosing a secret key and a set of permutable functions defined on a phase space for encrypting/decrypting messages, choosing a code for encoding messages to be sent as a number belonging to the phase space. The set of permutable functions includes chaotic maps generated by a composite function of first and second functions, and an inverse of the first function. The secret key is defined by the second function.

48 Claims, 1 Drawing Sheet

ENCRYPTION PROCESS EMPLOYING CHAOTIC MAPS AND DIGITAL SIGNATURE PROCESS

FIELD OF THE INVENTION

The present invention relates to data encryption, and in particular, to an encryption process that uses chaotic maps and to related digital signature processes.

BACKGROUND OF THE INVENTION

The pioneering work on chaos synchronization [1] led to several applications in communications, in which chaotic systems with continuous-value signals were used to transmit information. Several schemes have been developed which allow transformation of the information signal into a chaotic waveform on the transmitter side and to extract the information signal from the transmitted waveform on the receiver side. The most important among them are chaotic masking, chaos shift keying and chaotic modulation. In early days (from 1992 to 1996) the main research goal was to develop schemes in which a single chaotic system is used for both modulation and encryption. This approach eventually evolved into two distinct research areas: chaos-based modulation [2, 3] and chaos-based cryptography [4, 5].

In chaotic modulation, the digital information is mapped to inherently wide-band chaotic signals. Thus, chaotic modulation offers a novel approach to spread-spectrum communication. Two most promising approaches in chaos-based modulation have recently emerged. In the first approach, the unmodulated chaotic waveform is transmitted along with the modulated signal (transmitted reference scheme) either using a separate channel or using time division. One instance of this approach, called frequency-modulated differential chaos shift keying, was studied in-depth by Kolumban and Kennedy [2, 6]. In another approach, a chaotic reference is regenerated at the receiver with the help of synchronization. In the references [3, 7] an example of such an approach is proposed, in which chaotic time pulsed sequences are used instead of continuous time waveform. Since the information about the state of the chaotic signal is contained entirely in the timing between pulses, the distortions that affect the pulse shape will not significantly influence the ability of the chaotic pulse generators to synchronize. This approach is known as chaotic pulse position modulation.

Cryptography is generally acknowledged as the best method of data protection against passive and active fraud [8]. An overview of recent developments in the design of conventional encryption algorithms is given in [8]. Three most common encryption objects are block-encryption algorithms (private-key algorithms), pseudo-random number generators (additive stream ciphers) and public-key algorithms.

Block ciphers transform a relatively short string (typically 64, 128 or 256 bits) to a string of the same length under control of a secret key. Several block encryption ciphers based on chaotic maps have been proposed, in which a discretization (process that describes the way a chaotic map is implemented in the computer) is not realized by rounding the chaotic map according to the computer arithmetic, but rather is constructed explicitly. Pichler and Scharinger [9] proposed cryptographic systems based on chaotic permutations constructed by explicitly discretizing the two dimensional bakers map. Ridrich [10] extended their ideas to chaotic permutations on any size of two dimensional lattices. The permutations benefit from the expanding property along one axis, technically avoiding the contracting property along the other axis. Masuda and Aihara [11] considered a discrete version of the skew-tent map, which exploits important chaotic properties such as the sensitive dependence on initial conditions and the exponential information decay. They discussed the difference between the discretized map and the original map, explaining the ergodic-like and chaotic-like properties of the discretized map.

A pseudo-random number generator is a deterministic method, usually described with a mapping, to produce from a small set of random numbers, called the seed, and a larger set of random-looking numbers called pseudo-random numbers. Chaotic systems may be used to generate pseudo-random numbers. For example, in a series of papers [12], the authors proposed a chaos derived pseudo-random number generator. They numerically observed that the average cycle and transient lengths grow exponentially with the precision of implementation, and from this fact deduced that using high-precision arithmetic one can obtain PRNGs which are still of cryptographic interest. Statistical properties of binary sequences generated by class of ergodic maps with some symmetrical properties are discussed in [13]. The authors derived a sufficient condition for this class of maps to produce a sequence if independent and identically distributed binary random variables. However, the authors did not discuss the implementation of these maps on finite-state machines and the consequence this implementation may have on the randomness of the generated sequences.

Certain applications in cryptography require the use of a truly random number generator (RNG), which is a device that outputs a sequence of statistically independent and unbiased numbers. It is widely accepted that the core of any RNG must be an intrinsically random physical process. Thus, it is no surprise that the proposals and implementations of RNGs range from tossing a coin, to measuring thermal noise from a resistor and shot noise from a Zener diode or a vacuum tube, measuring radioactive decay from a radioactive source, and sampling a stable high-frequency oscillator with an unstable low-frequency clock, to mention only a few proposals. For chaos-based generators of truly random numbers see for example references [14, 15].

Several applications [16, 17, 18] of chaos in cryptography have been proposed. The work presented in [16, 17, 18] ushers in the era of scientific chaos-based cryptography, which will trigger more research and real-world applications of chaos-based data protection.

In the work [16] a method for generating truly random numbers has been designed and implemented in CMOS technology. Random numbers are crucial importance in every encryption and data protection application. Block encryption algorithm based on chaotic maps are proposed in the patent application "Chaos-based data protection using time-discrete dynamical systems" by L. Kocarev, G. Jakimoski, G. G. Rizzotto, and P. Amato [17]. Lower bounds of number of active S-boxes as well as the upper bounds for differential and linear probabilities in the proposed algorithm have been derived analytically, and therefore, the resistance of this algorithm to differential and linear attacks has been proved. L. Kocarev, P. Amato, and G. G. Rizzotto in [18] have presented a class of pseudo-random-bit generators, for which security does not rely on a number-theoretical problem, and therefore, does not use modular multiplications. In contrast, its security relies on the large numbers of branches for an inverse of a function used in the algorithm. The generators use only binary operations and have been efficiently implemented in software.

The article *Communication Theory of Secrecy Systems* [22] by C. E. Shannon, published in 1949, ushered in the era of scientific secret-key cryptography. However, Shannon's article did not lead to an explosion of researches on cryptography comparable to that triggered by his earlier articles published in 1948 in information theory [23]. The real explosion of works on cryptography came with an article by W. Diffie and M. E. Hellman [24]. Diffie and Hellman showed for the first time that a secret communication was possible without any transfer of a secret key between sender and recipient, thus starting the era of public-key cryptography. Moreover, they suggested that computational complexity theory could be used for future research in cryptography.

Substantially, an encryption process is a process for transmitting data in a mode that ensures that the data remain private, by converting a message, referred to as a plain-text, into an encrypted format, referred to as a cipher-text. A sender encrypts the message by using an encryption key, while the recipient of the message recovers the plain-text from the received cipher-text by using a decryption key.

Public-key encryption algorithms, also called asymmetric algorithms, are designed so that (i) the encryption key is different from the decryption key; (ii) the encryption key can be made public; and (iii) the decryption key cannot, at least in a reasonable amount of time, be calculated from the encryption key.

There are many public-key algorithms. Only a few of them are both secure and practical, and only three of them work well for both encryption and digital signature: RSA, ElGamal, and Rabin [8]. In a public-key encryption system [8] each entity A has a public key "e" and a corresponding private key "d". In secure systems, the task of calculating the private key "d" from the public key "e" is practically impossible.

The public key defines an encryption transformation $E_e$, while the private key defines the associated decryption transformation $D_d$. A sender B wishing to send a message M to a recipient A must obtain an authentic copy of the recipient public key "e", use the encryption transformation to obtain the cypher-text $c=E_e(M)$, and transmit the encrypted message "c" to the recipient A. The recipient A decrypts the cipher-text "c" using the decryption transformation and obtains the plain-text $M=D_d(C)$.

Since 1976, numerous public-key algorithms have been proposed. Three most widely used public-key encryption processes are RSA, Rabin and ElGamal. The security of the RSA process is based on the intractability of the integer factorization problem. In the Rabin public-key encryption process, the problem faced by a passive adversary is computationally equivalent to factorizing a number. The security of the ElGamal public-key encryption process is based on the intractability of the discrete-logarithm problem.

Recall first the basic ElGamal algorithm. The ElGamal public-key algorithm can be viewed as Diffie-Hellman key agreement in key transfer-mode [8]. Consider a class of functions defined as $\pi_p(x)=x^p(\mod N)$ wherein N is a prime number, and x is a generator of the multiplicative group $Z^*_N$, and $1 \leq p \leq N-2$.

Any two functions $\pi_p$ and $\pi_q$, commute under composition:

$$\pi_p(\pi_q(x))=\pi_{pq}(x)$$

The Diffie-Hellman key agreement protocol describes how Alice and Bob agree on their common secret key. Alice generates a number p, computes $y=\pi_p(x)$ and sends (x, y) to Bob. Bob creates a number q, computes $z=\pi_q(x)$ and sends z to Alice. The secret key, which can be shared by both Alice and Bob, is computed as follows. Alice computes the secret key k as $k=\pi_p(z)$, Bob computes the secret key k as $k=\pi_q(y)$.

In the ElGamal public-key scheme, Alice generates a large random prime N and a generator x of the multiplicative group $Z^*_N$ of integers modulo N. She also generates a random integer $s \leq N-2$ and computes $A=x^s(\mod N)$. Alice's public key is (x, N, A); Alice's private key is s. To encrypt a message m, Bob selects a random integer $r \leq N-2$, computes $B=x^r(\mod N)$ and $X=mA^r(\mod N)$, and sends the cipher-text c=(B,X) to Alice. To recover the message m from c, Alice uses the private key s to recover m by computing $m=B^{-s}X(\mod N)$. The decryption allows recovery of the original message because $B^{-s}mA^r \equiv x^{-rs}mx^{rs} \equiv m(\mod N)$.

Recall now the RSA algorithm. Let $N=pq$ and $\phi=(p-1)\cdot(q-1)$, where p and q are two large random (and distinct) primes p and q. Alice selects a random integer e, $1<e<\phi$, such that the greatest common divisor of "e" and "$\phi$" is 1:

$$gcd(e,\phi)=1$$

and computes the unique integer d, $1<d<\phi$, such that $ed \equiv 1 (\mod \phi)$.

Alice's public key is (N, c); Alice's private key is d. To encrypt a message m, Bob computes $c=m^e(\mod N)$ and sends it to Alice. To recover the message m from c, Alice should use the private key d to recover $m=c^e(\mod N)$.

Let $\pi_p(x)=x^p(\mod N)$. The decryption in the RSA algorithm works for two reasons: the functions $\pi_e$ and $\pi_d$ commute under composition, and p is a periodic point of the function $\pi_{ed}$ for every m such that $m^{ed} \equiv m(\mod N)$. The last follows from the following observation. Since $ed \equiv 1 (\mod \phi)$, there is an integer k such that $ed=1+k\phi$. If $gcd(m,p)=1$ then by Fermat's theorem $m^{p-1} \equiv 1(\mod p)$. Raising both sides of this congruence to the power of $k \cdot (q-1)$ and then multiplying both sides by m yields $m^{ed} \equiv m(\mod p)$.

By the same argument it is possible to demonstrate that $m^{ed} \equiv m(\mod q)$. Finally, since p and q are distinct primes, thus $m^{ed} \equiv m(\mod N)$. Public-key encryption processes are much slower than symmetric-key encryption algorithms. For this reason, public-key encryption is most commonly used for encrypting short data and/or for transporting encryption keys, subsequently used for data encryption by symmetric-key algorithms.

SUMMARY OF THE INVENTION

In view of the foregoing background, an object of the present invention is to provide an encryption process, with or without public-keys, that may be implemented on common computers and when compared to the known public-key encryption processes can be executed in a reduced amount of time.

The encryption process of the present invention (i) is both secure and practical, (ii) is very fast, and (iii) may be used for realizing a digital signature process.

The invention essentially comprises encrypting/decrypting data by using permutable chaotic maps $f(p(f^{-1}(.)))$, which are composite functions of a first function $f(.)$, the inverse function of the first function $f^{-1}(.)$ and a second function $p(.)$. These chaotic maps may be used for realizing encryption processes that may use a public key.

In general, each entity generates its own secret key of the process by using the second function $p(.)$, while the first function is pre-established. For example, the function $f(.)$ and the inverse thereof $f^{-1}(.)$ may be implemented in an encrypting/decrypting device, and it is necessary to specify only the second function p(.). The first and second functions are defined on the same phase space, that is, they are defined in the same domain and their images are in this domain.

More precisely, the invention provides an encryption process that comprises the following steps: preliminarily choosing at least a secret key and a set of permutable functions defined on a certain phase space for encrypting/decrypting messages; choosing a code for encoding messages to be sent in the form of a number belonging to the phase space; and wherein the set of permutable functions is composed of chaotic maps generated by a composite function of a first function, the inverse function of the first function and a second function. The secret key is defined by using the second function.

Preferably the chaotic maps are Chebyshev maps, the degree of which is a secret key, or even chaotic maps, the second function of which is a trapdoor function (see [8]).

The invention provides further digital signature processes for a public-key encryption process according to the method of this invention that use chaotic maps, the second function of which is defined by a parameter (e.g., Chebyshev maps), and for a public-key encryption process that uses trapdoor functions.

The processes according to this invention may be easily implemented by a software computer program.

BRIEF DESCRIPTION OF THE DRAWINGS

The different aspects and advantages will appear even more evident through a detailed description referring to the attached FIG. 1 that depicts a diagram of four Chebyshev polynomials.

DETAILED DESCRIPTION OF THE PREFERRED EMBODIMENTS

Figure 1:
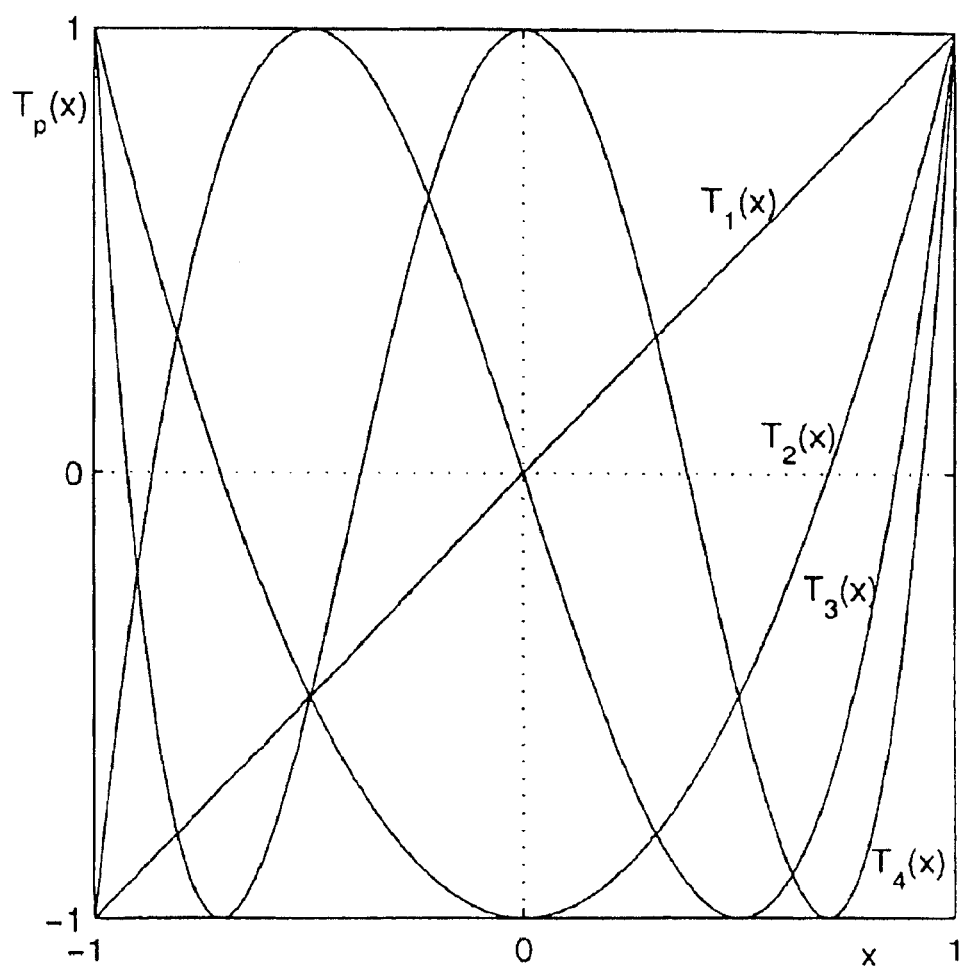

The encryption process of the invention is based on the use of chaotic maps that are composite functions $f(p(f^{-1}(.)))$ generated by composing a first function $f(.)$, a second function $p(.)$ and the inverse of the first function $f^{-1}(.)$. The functions $f(.)$ and $p(.)$ are defined on a phase space PS, that is, they are defined on a certain domain and their images are in the same domain, that is $$f(.):PS \rightarrow PS; \; p(.):PS \rightarrow PS.$$

The phase space PS can be any domain and must be the same for functions $f(.)$ and $p(.)$. The invention essentially is based upon encrypting/decrypting messages by using permutable chaotic maps sharing the same first function $f(.)$, and defining a secret key by using the second function $p(.)$. Chaotic maps may be used both in public-key encryption processes and in processes that contemplate only a secret key.

Section 1: Symmetric-key encryption process. A symmetric key encryption process of the invention is implemented by using two permutable chaotic maps, a first $f(p_S(f^{-1}(.)))$ and a second $f(p_R(f^{-1}(.)))$, which means that $p_S(p_R(.))=p_R(p_S(.))$. The second functions of which $p_S(.)$ and $p_R(.)$ are invertible in the phase space.

A sender encrypts a message M, representing it in numerical form, to be sent to a recipient, by calculating the image thereof $f(p_S(f^{-1}(M)))$ through the sender chaotic map. On his turn the recipient encrypts the encrypted message using his own chaotic map, sending back to the sender a twice encrypted message $f(p_R(p_S(f^{-1}(M))))=f(p_S(p_R(f^{-1}(M))))$.

The sender decrypts the twice encrypted message, sending to the recipient the quantity $f(p_R(f^{-1}(M)))$ because $$f(p_S^{-1}(f^{-1}(f(p_R(p_S(f^{-1}(M))))))) = f(p_S^{-1}(p_S(p_R(f^{-1}(M))))) = f(p_R(f^{-1}(M))).$$

Finally, the recipient recovers the message M by decrypting the quantity $f(p_R(f^{-1}(M)))$.

Section 2: Public-key encryption process. Chaotic maps may be used also in public key encryption processes and in related digital signature processes. A first public-key encryption process of the invention that uses chaotic maps is based on the so-called trapdoor functions (see [8]), which are functions the inverse of which is extremely difficult to compute.

According to this encryption process, a recipient of a message chooses a second function $p_R(.)$ as a public key, the inverse of which $p_R^{-1}(.)$ is hardly computable constitutes his private key. A sender of a message encrypts an encoded message M by calculating the image thereof through the chaotic map using the public key of the recipient of the message M. Finally, the recipient decrypts the encrypted message by using his private key $p_R^{-1}(.)$.

A digital signature for a message encrypted according to the above process is generated as follows. A sender encrypts a digital signature SIG, which is substantially a number representing a pre-established string or even a message M to be sent, by calculating the image thereof through the chaotic map $f(p_S^{-1}(f^{-1}(.)))$ using his own private key $p_S^{-1}(.)$, and encrypts a message M together with the encrypted digital signature appended thereto by calculating the image of the combination of the message and the encrypted digital signature through the chaotic map $f(p_R(f^{-1}(.)))$ using the recipient public-key $p_R(.)$.

A recipient decrypts the received encrypted message by calculating the image thereof through the chaotic map $f(p_R^{-1}(f^{-1}(.)))$ using his own private key $p_R^{-1}(.)$, and obtains the digital signature SIG decrypting the just decrypted message by calculating the image thereof through the chaotic map $f(p_S(f^{-1}(.)))$ using the sender public key $p_S(.)$.

Section 3: Chebyshev polynomials. For sake of simplicity, an embodiment of an encryption process of this invention is illustrated in the ensuing description by referring to Chebyshev polynomial maps, which are a particular kind of chaotic maps, though what will be similar for a chaotic map of any other kind.

A Chebyshev polynomial map $T_p(.):[-1,1] \rightarrow [-1,1]$ of degree p is $$T_p(x) = \cos(p \cdot \cos^{-1}(x)) \qquad (1)$$

where $p=2, 3, \ldots$ This map has unique, absolutely continuous invariant measure:

$$\mu(x)dx = \frac{dx}{\pi\sqrt{1-x^2}}$$

with a positive Lyapunov exponent $\lambda = \ln p$. For p=2, Eq. (1) becomes the well-known logistic map [33]. One of the most remarkable properties of the Chebyshev polynomials is the so-called semi-group property [25]:

$$T_r(T_s(x)) = T_{rs}(x) \qquad (2)$$

An immediate consequence of this property is that Chebyshev polynomials are permutable, i.e., $$T_r(T_s(x)) = T_s(T_r(x)) \qquad (3)$$

Let $x_n$ be the trajectory of the Chebyshev map $x_{n+1} = T_p(x_n)$ for $n=0, 1, 2 \ldots$ in the phase space $[-1,1]$ with initial condition $x_0$. Therefore, for Eq. (2)

$x_n = T_p(T_p(\ldots T_p(x_0))) = T_{p^n}(x_0)$.

Several low order Chebyshev polynomials are:

$T_2(x) = 2x^2 - 1$ $T_3(x) = 4x^3 - 3x^2$ $T_4(x) = 8x^4 - 8x^2 + 1$ and are graphically shown in FIG. 1.

Section 4: A second public-key encryption process. A second public-key encryption process of the invention is in some measure similar to the ElGamal public-key process, but is different from it since it uses chaotic maps. A preferred embodiment thereof is now presented again using Chebyshev maps for an example, but that may be easily generalized for employing any other chaotic map.

A recipient A of a message M generates an integer "r" (preferably a large integer), selects a random number $x \in [-1,1]$ and computes $T_r(x)$. The recipient public key is $(x, T_r(x))$, while his private key is the integer "r".

A sender B encrypts a message M to be sent to the recipient A by performing the following steps: obtaining the recipient authentic public key $(x, T_r(x))$; encoding the message into a number $M \in [-1,1]$; generating an integer "s" (preferably a relatively large integer, as explained above); calculating $T_s(x)$ and $T_{sr}(x) = T_s(T_r(x))$; calculating $X = q_{T_s(T_r(x))}(M)$; and sending the cipher-text $c = (T_s(x), X)$ to the recipient A. The function $q_{par}(.)$ is a pre-established invertible parametric function defined almost everywhere on the phase space of the chaotic map, which in this case is the domain $[-1,1]$.

The recipient A recovers the plain-text M from the cipher text "c" by using his private key "r" to calculate $T_{rs}(x) = T_r(T_s(x))$, which is equal to $T_{sr}(x)$; and calculating $M = q^{-1}_{T_{rs}(x)}(X)$.

The function $q_{par}(.)$ should be defined almost everywhere on $[-1,1]$, that is, it should have at most isolated singular points for $par \in [-1,1]$. This requisite is necessary because if this function has at most isolated points of discontinuity, the probability that the value X does not exist is theoretically null.

The parametric function $q_{par}(.)$ may be defined as the product between its argument by the parameter "par". It may be defined also as the ratio between the argument of the function by the parameter "par", or the sum or even the arithmetic mean of them. Let us suppose that this function is $q_{par}(M) = M \cdot par$.

Section 5: Implementation. There are two problems related to the software implementation of the algorithm. The first problem is that, encryption, decryption, signing and verifying signatures all involve multiplications by large numbers. This operation is preferably performed as follows. The number "s" is first factorized:

$$s = \underbrace{s_1 \cdots s_1}_{k_1} \underbrace{s_2 \cdots s_2}_{k_2} \cdots \underbrace{s_i \cdots s_i}_{k_i} = s_1^{k_1} s_2^{k_2} \cdots s_i^{k_i} \quad (4)$$

Then $T_s(y)$ is calculated by iterating $k_1 + k_2 \ldots + k_i$ times the Chebyshev map according to the following formula $$T_s(y) = \underbrace{T_{s_1}(\cdots T_{s_1}}_{k_1} \cdots \underbrace{T_{s_i} \cdots T_{s_i}(y)}_{k_i})) \quad (5)$$

The fact that Chebyshev polynomials satisfy Eq. (5) makes them particularly suited for implementing the encryption process of the invention.

The second problem is related to the fact that the message M is recovered by using Eq. (3). However, due to the chaotic nature of the Chebyshev map, Eq. (3) holds only for $s < s_0$ and $r < r_0$, where $s_0$ and $r_0$ are numbers which depend on the arithmetic precision used for implementing the algorithm. The following TABLE 1 shows the values of $s_0$ and $r_0$ using different precision arithmetic and imposing that a 128 bits message be decrypted.

TABLE 1

| N-bit precision | $r_0, s_0$ |
|---|---|
| N = 256 | $\sim 2^{70}$ |
| N = 512 | $\sim 2^{190}$ |
| N = 1024 | $\sim 2^{450}$ |
| N = 2048 | $\sim 2^{9700}$ |

Preferably, the present encryption process is implemented by software that uses the GNU multiple precision arithmetic library [31]. GNU MP is a portable library written in C language for arbitrary precision arithmetic on integers, rational functions, and floating-point numbers. The library GNU MP does not have a routine for computing cosine functions with arbitrary precision. For this reason the value of $T_s(x)$ is calculated by using the following recursive relation between Chebyshev polynomials:

$$T_{p+1}(x) = 2x \cdot T_p(x) - T_{p-1}(x) \quad (6)$$

with $T_0(x) = 1$ and $T_1(x) = x$.

Let's show a numerical example, using a 2048-bit precision arithmetic. The private and public keys of the entity A are $r = 2^{64} \cdot 3^{36} \cdot 113^{21} \cdot 23^{81} \cdot 59^{48} \cong 2^{910} (x, T_r(x)) = (0.25749480, -0.0176128306 \ldots)$ respectively.

The private key "s" of the entity B may be $s = 3^{54} \cdot 7^{22} \cdot 41^{55} \cdot 133^{19} \cdot 31^{70} \cong 2^{920}$ and a sample message to be sent may be $M = 0.\underbrace{1 \cdots}_{10} 14 \underbrace{\cdots 4}_{10}$.

The sender B computes $T_s(x) = 0.9921943793 \ldots$ $T_s(T_r(x)) = 0.6571609510 \ldots$ $X = -0.7301788346 \ldots$ and sends the cipher-text $c = (T_r(x), X)$ to the recipient A, which on his turn successfully recovers the plain-text message M.

Section 6: Considerations. According to another embodiment of this invention, the chaotic maps are Chebyshev polynomial maps defined according to the following formula:

$\cos(b^p \cdot \cos^{-1}(y))$ wherein the order $b^p$ of the map is a power of a pre-established integer base b raised to an integer exponent p. Images of these Chebyshev polynomial maps may be conveniently calculated using equations (4), (5) and (6) and can be used in the encryption processes of this invention wherein the integer exponent p is the secret key.

Advantages and peculiarities of the embodiment of an encryption process of this invention using Chebyshev polynomial maps are mentioned below.

1. The main advantage over existing public-key encryption algorithms is that the private key can be any large integer. There is no need to look for large prime numbers. As can be seen from Eq. (4), generating a large number "s" and using it with Chebyshev polynomial maps as a secret key is easy.

2. It is reasonably secure even for relatively small numbers.

3. The algorithm is reasonably fast. On an Intel Pentium 550 MHz processor, the present algorithm encrypts and decrypts 128-bit messages using 2048 bit precision arithmetic in less than 1s. The total number of multiplications and additions required by the encryption process, computing $T_s(x)$ by equations (5) and (6), is $$d = 2\left(\sum_{j=1}^{j=i} s_j k_j\right).$$

It is possible to optimize and/or speed up the algorithm by minimizing "d" while keeping "s" large or by using a procedure for computing cosine functions with arbitrary precision.

4. An advantage of using Chebyshev maps is that x and $T_s(x)$ (or $T_s(x)$ and X) are independent random variables.

5. It is possible to realize a relative digital signature process.

6. The present encryption process, as well as the basic ElGamal algorithm, uses random numbers.

7. A disadvantage of the algorithm of this invention, which comes from the chaotic property of the Chebyshev map, is that the length of the plain-text message should always be smaller than the precision used in the algorithm.

8. Another disadvantage of the encryption process that derives from the ElGamal-type structure of the algorithm, is that the cipher-text "c" is in the form $c=(T_s(x), X)$ so that the total length of the cipher-text, for 2048-bit arithmetic precision, is 4096 bits.

9. Let us suppose that the message M is a plain English text written in the following form $M=\pm 0.a_1 a_2 \ldots a_k$, where $a_i \in \{0,1, \ldots 9\}$. Given that $T_r(x) \in [-1,1]$, an adversary could use this strategy to break the preferred embodiment of the encryption process in which $X=M \cdot T_{rs}(x)$: by dividing the interval $[-1, 1]$ in a finite number of sub-intervals, choosing a number y from each sub-interval, computing $M=X/y$ and guessing the meaning of a first digit $a_i$ of the message M. In order to jeopardize this strategy, the sender B should choose the first 10 digits $a_i$ (that is for $i=1, 2, \ldots, 10$) in a random mode (which do not have to be known by the recipient A). The hypothetical attack would not work if all $a_i$ are random numbers, as it happens when the message M is a key for a symmetric-key encryption process.

The just described algorithm, wherein $X=M \cdot T_{rs}(x)$, works with Chebyshev polynomials, but it can be generalized to work with any chaotic map $T_r(.)=f(r \cdot f^{-1}(.))$, the second function of which is a linear function.

Now the following question is addressed: is there any other chaotic map with the semi-group property $T_r(T_s(.))=T_{rs}(.)$? Let us first consider polynomials. Two polynomials, P(.) and Q(.), are permutable if $P(Q(x))=Q(P(x))$ for all x. Let us write $P \circ Q$ to indicate the composite function $P(Q(.))$.

A set of polynomials of positive degree and such that any two polynomials are permutable, is called a chain. The Chebyshev polynomials $T_1(x), T_2(x), \ldots$ form a chain. The powers $\pi_j(x)=x^j, j=1, 2 \ldots$ form a chain as well. Suppose that $\lambda(x)=ax+b$, $a \neq 0$ and $\lambda^{-1}(x)=(x-b)/a$. If P(.) and Q(.) are permutable, also $\lambda^{-1} \circ P \circ \lambda$ and $\lambda^{-1} \circ Q \circ \lambda$ are permutable. Let us say that P(.) and $\lambda^{-1} \circ P \circ \lambda$ are similar.

The answer to the above question for polynomials is given by the following theorem [25]: if P(.) and Q(.) are permutable, either both are iterations of the same polynomial or both are similar, with respect to the same function $\lambda$, to either Chebyshev polynomials or powers. Thus, the sequences $\{T_j\}$ and $\{\pi_j\}$ are the only chains of polynomials, up to similarities.

Powers have been used in cryptography for a long time. For example, powers are used for encryption and decryption in the ElGamal public-key process. In this case the set of functions is defined as $\pi_p = x^p \mod n$, where n is a prime number, x is a generator of the multiplicative group $Z^*_n$, and p is an integer such that $1 \leq p \leq n-2$. Any two functions belonging to $\pi_p$, $\forall p=1, 2 \ldots n-2$, are permutable.

Whether the chain $\{\pi_j\}=x^j, j=1,2, \ldots, x \in R$, can be used in a public-key encryption process is still an open question. Considering only the functions $x^j \mod 1$, defined on the phase space [0, 1], which form a chain, then the dynamic is trivial: for $j \geq 2$ a trajectory of the map approaches zero. However, the following class of functions $T_p(x)=((x+1)^p-1) \mod 1$, defined on the phase space [0, 1], which are chaotic, can be used in public-key encryption process. Another example of chaotic maps that can be used in encryption processes is $$T_p(x) = \cos \lfloor (2+\cos^{-1}(x)^p - 2 \rfloor$$

defined on [−1, 1].

At the present time only one class of rational maps with semi-group property is known: the so-called Jacobian elliptic Chebyshev rational maps introduced recently by Kohda and Fujisaki [32]. This embodiment of the second public-key encryption process of this invention works with these maps as well.

The ElGamal signature algorithm is a randomized signature process. It generates digital signatures appended on binary messages of arbitrary length, and requires a hash function $h:\{0,1\}^* \to Z_p$ where p is a large prime number and $Z_p$ is the set of integers modulo p. The DSA (Digital Signature Algorithm) is a variation of the ElGamal signature algorithm. For an introduction to hash functions, see [8].

Section 7: Another digital signature process. Yet another object of this present invention is a digital signature process for the above described second public-key encryption process, that contemplates the use of chaotic maps, the second function of which may be fully identified by a parameter, such as the Chebyshev polynomial maps.

Substantially, a sender performs the following steps: generates a public key $(x, T_a(x))$, wherein a first integer number "a" is the parameter of the chaotic map; generates a second integer number "k" and calculating a second image $T_k(x)$ of the random number x through the chaotic map $T_k(.)$, the parameter of which is the second integer number k; generates a verification number h; chooses a first test function $V_1(.)$, a second test function $V_2(.)$ and a third test function $H(.)$, which in general depend on four independent variables, such that $$V_1(T_a(x), T_k(x), H(h, T_k(x), k, a), x) = V_2(h, T_k(x), H(h, T_k(x), k, a), x);$$

A second verification number s is generated using the third test function H(.) according to the following formula s=H(h,$T_k$(x),k,a). The pair ($T_k$(x), s) is sent as signature of a message M.

A receiver performs the following steps: obtains the authentic sender public key (x, $T_a$(x)); calculates a first test value $v_1$ using the first test function $V_1$(.) according to the following formula $v_1$=$V_1$($T_a$(x),$T_k$(x),s,x); calculates a second test value $v_2$ using the second test function $V_2$(.) and the verification number h according to the following formula $v_2$=$V_2$(h,$T_k$(x),s,x); and verifies whether the test values first $v_1$ and second $v_2$ are identical.

Obviously, the test functions must be designed so that only the owner of the private key "a" is capable of generating a number "s" for which $v_1$=$v_2$. As it may be noticed, this digital signature process does not need any hash function, because the verification number "h" may be any pre-established number. Of course, it is possible to use hash functions in this digital signature process by calculating the verification number as the image through a hash h(.) function of the message M to be sent.

Two possible embodiments of this digital signature process for the case in which Chebyshev maps are used, are illustrated. According to a first embodiment, it is necessary to define a first $g_1$(.) and a second $g_2$(.) auxiliary function such that $$g_1(h,T_k(x)) \cdot k = g_2(s) \cdot a; \quad (7)$$

the first test value $v_1$ is the image of the random number x through the chaotic map according to the following formula $v_1$=$T_{g_2(s)}$($T_a$(x)); the second test value $v_2$ is the image of the random number x through the chaotic map according to the following formula $v_2$=$T_{g_1(h,T_k(x))}$($T_k$(x)).

Preferably, the first auxiliary function returns the value of the verification number h $$g_1(h,T_k(x))=h$$

the second auxiliary function $g_2$(.) is the identity function $$g_2(s)=s$$

and so, considering Eq. (7), $$s = \frac{h \cdot k}{a}.$$

According to another embodiment of the digital signature process of this invention, the second verification number s is the ratio between the difference between the verification number h and the product between the integer a by the value $T_k$(x), and the second integer number k, $$\frac{h - a \cdot T_k(x)}{k}$$

while the second test value $v_2$ is the image of the random number x through the Chebyshev map $\cos(h \cdot \cos^{-1}(.))$ the order of which is the verification number h.

The receiver carries out the following operations: calculates an auxiliary value $T_{T_k(x)}(T_a(x))$=$T_{T_k(x) \cdot a}(x)$; calculates a second auxiliary value $T_s(T_k(x))$=$T_{sk}(x)$; calculates the first test value $v_1$ $$v_1 = T_{T_k(x)a+ks}(x)$$

by combining the auxiliary values $T_{T_k(x)a}(x)$ and $T_{sk}(x)$ according to the following equation $$v_1 = T_{T_k(x)a+ks}(x) = T_{T_k(x)a}(x) \cdot T_{ks}(x) - \sqrt{(1-T_{T_k(x)a}^2(x)) \cdot (1-T_{ks}^2(x))} \quad (8)$$

Proof: given that $$T_{T_k(x)a+ks}(x) = \cos \lfloor (T_k(x) \cdot a + ks) \cdot \cos^{-1}(x) \rfloor$$

applying the following trigonometric identity $$\cos(y+z) = \cos y \cdot \cos z - \sin y \cdot \sin z$$

it is possible to state that $$\cos \lfloor (T_k(x) \cdot a + ks) \cdot \cos^{-1}(x) \rfloor = \cos \lfloor T_k(x) \cdot a \cdot \cos^{-1}(x) \rfloor \cdot \cos \lfloor ks \cdot \cos^{-1}(x) \rfloor + -\sin \lfloor T_k(x) \cdot a \cdot \cos^{-1}(x) \rfloor \cdot \sin \lfloor ks \cdot \cos^{-1}(x) \rfloor$$

and thus Eq. (8) is demonstrated.

Section 8: Further improvements. Public-key encryption processes that use Chebyshev maps are both secure and practical and can be used for both encryption and digital signature. In the previous works [19, 20, 21] the ElGamal public-key algorithm was extended to Chebyshev maps, defined on the set [−1, 1] and implemented using floating-point arithmetic.

According to another embodiment of this invention, it is possible to realize encryption processes using chaotic maps that always return integer numbers. Such encryption processes could be even faster than the previously disclosed processes because they contemplate only operations on integer numbers, that are performed faster than operations on floating point numbers.

ElGamal-like and RSA-like public-key algorithms using Chebyshev maps are proposed. Furthermore, the analysis of the periodic orbits in sequences of integers generated by Chebyshev maps is based on the arithmetic properties of torus automorphisms, another well-known class of chaotic maps.

The encryption process of the invention may be implemented also using torus automorphisms as chaotic maps. In order to explain more clearly how it is possible to use torus automorphisms in an encryption process of the invention, a brief introduction about torus automorphisms is given.

Section 9: Torus automorphisms. In this section some general properties of automorphisms of the two-dimensional torus are briefly discussed. An automorphism of the two-torus is implemented by 2×2 matrix M with integer entities and determinant ±1. The requirement that the matrix M has integer entities ensures that M maps torus into itself. The requirement that the determinant of the matrix M is ±1 guarantees invertibility. Here only strictly unimodular automorphisms, for which det M=1, are considered.

Let M be a 2-torus automorphism $$\begin{bmatrix} x' \\ y' \end{bmatrix} = M \begin{bmatrix} x \\ y \end{bmatrix} (\mathrm{mod}\ 1)$$

where x, y∈[0, 1]. Let k be a trace (which is an integer) of the automorphism M, f(z)=$z^2$−kz+1 its characteristic polynomial, and λ one of its roots (for example the largest one):

$$\lambda = \frac{k + \sqrt{k^2 - 4}}{2}$$

It is well-known that for k>2 (considering only positive k) that the automorphism M has strong chaotic properties, and in particular, it has a dense set of unstable periodic orbits. The detail structure of periodic orbits of the 2-torus automorphisms has been studied by Percival and Vivaldi [26].

Periodic orbits of a torus automorphism include those points having rational coordinates $\xi=p_1/q_1$, $\eta=p_2/q_2$, $p_i$, $q_i$ integers. Let $p_i$, $q_i$ be co-primes (their greatest common divisor is 1) and q be the least common multiple of $q_1$ and $q_2$. Clearing denominators, letting M act on $Z^2$, the lattice of integral vectors, and then the periodicity of the torus is taken into account by identifying points whose coordinates differ multiplies of q, i.e., the factor group $Z^2/gZ^2$ is considered. Thus, the dynamics of periodic orbits is dynamics over a finite set of integers.

The article [26] illustrates the close link existing between arithmetic in algebraic number fields and strong chaotic dynamics. Main conclusions of Ref. [26] may be summarized as follows.

A 2-torus automorphism has three different types of (periodic) orbit structure, according to the classification of rational primes: inert, split and ramified primes [27].

The orbits which correspond to inert primes are almost without structure. The split primes have two distinct ideal factors, which correspond to orbits confined to invariant sublattices. For this reason, two ideal orbits which exist on split prime lattices are the "most ergodic" orbits, and thus, equilibrium averages computed with them minimize statistical fluctuations.

Both inert and split prime lattices are found infinitely often, and moreover with the same frequency in both cases. These are consequences of Dirichelet's theorem on the existence of infinity many primes in any arithmetic progression [28].

The ramified prime lattices support orbits which are exceptionally regular. However, there is only a finite number of ramified primes, so that this apparently contradictory phenomenon of regularity in chaos is in fact very rare.

Section 10: Floating-point arithmetic versus integer arithmetic. Chaotic systems are defined on real numbers. Any encryption algorithm which uses chaotic maps when implemented on a computer (finite-state machine) becomes a transformation from a finite set onto itself. Because of its wide dynamic range, the floating-point implementation seems to be the most appropriate for software realizations (implementation) of Chebyshev polynomials.

However, there are three reasons for not using floating-point arithmetic in public-key encryption. First, floating-point numbers are not uniformly distributed over any given interval of the real axis [29]. Furthermore, one may observe the existence of redundant number representations. Indeed, due to the normalized calculations in floating-point arithmetic, some floating-point numbers represent the same real signal value.

Second, non-invertibility of Chebyshev polynomials and their floating-point implementation imply a restriction on the length of the message. Indeed, the public-key encryption scheme proposed in [20, 21] and in this patent application can be viewed as a generalization of the ElGamal public-key process using Chebyshev polynomials.

The algorithm is summarized for sake of clarity. Alice generates a large integer s, selects a random number $x \in [-1,1]$ and computes $T_s(x)$. Alice's public key is $(x, T_s(x))$, while her private key is s. Bob represents the message as a number $M \in [-1,1]$, generates a large integer r and computes $T_r(x)$, $T_{rs}(x)=T_r(T_s(x))$ and $X=MT_{rs}$. Bob sends the cipher-text $c=(T_r(x),X)$ to Alice. To recover plain-text M from c, Alice uses the private key s to compute $T_{sr}(x)=T_s(T_r(x))$, and recovers M by computing $$M = \frac{X}{T_{sr}}.$$

Let $l_s$, $l_r$, $l_M$ be the lengths (in bits) of s, r, and M, respectively, and let N-bit precision arithmetic is used in a software implementation of the algorithm: then $l_m \leq N-l_s-l_r$ (see [20, 21]).

Third, the most important reason, there are no analytical tools for understanding the periodic structure of the periodic orbits in the floating-point implementation of chaotic maps (when implement on a computer all chaotic maps are periodic: all trajectories are eventually periodic). On the other hand, when using integers one may hope if a possible link between number theory and chaos theory has been established, as in the case of the torus automorphisms, to understand the structure of the orbits.

Section 11: Modified Chebyshev polynominals. In this section the following map is used $$T_p: \{0,1, \ldots, N-1\} \to \{0,1, \ldots, N-1\}$$

defined as:

$$y=T_p(x)(\bmod N) \qquad (9)$$

where x and N are integers and $T_p(x)$ is a Chebyshev map, to extend ElGamal and RSA public-key algorithms. The chaotic map (9) will be referred as a "modified Chebyshev polynomial".

The modified Chebyshev polynomials can replace powers in ElGamal and/or RSA public-key algorithms only if they commute under composition and one can compute the period of their orbits.

The following two theorems show properties of modified Chebyshev polynomials. Theorem 1. Modified Chebyshev polynomials commute under composition, that is:

$$T_p(T_q(x)(\bmod N))(\bmod N)=T_{pq}(x)(\bmod N)$$

Theorem 2. Let N be an odd prime and $x \in Z$ such that $0 \leq x < N$. Then the period of the sequence $T_n(x)(\bmod N)$, for n=0, 1, 2 . . . is a divisor of $N^2-1$.

The first theorem can be easily verified; the proof of the second theorem is given in Section 17. Sample trajectories of the map (9) for different values of the variable x when N=19 are given below:

x=0 1, 0, 18, 0, 1, 0, 18, 0, . . .

x=1 1, 1, 1, 1, . . .

x=2 1, 2, 7, 7, 2, 1, 2, 7, 7, 2, . . .

x=3 1, 3, 17, 4, 7, 0, 12, 15, 2, 16, 18, 16, 2, 15, 12, 0, 7, 4, 17, 3, . . .

x=4 1, 4, 12, 16, 2, 0, 17, 3, 7, 15, 18, 15, 7, 3, 17, 0, 2, 16, 12, 4, . . .

x=5 1, 5, 11, 10, 13, 6, 9, 8, 14, 18, 14, 8, 9, 6, 13, 10, 11, 5, . . .

The periods of all trajectories of the map (9) with N=19 are listed in the following Table

TABLE 2

| X | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| Period | 4 | 1 | 5 | 20 | 20 | 18 | 18 | 5 | 18 | 3 | 6 | 9 | 10 | 9 | 9 | 20 | 20 | 10 | 2 |

These periods always divide the number $18 \times 20 = 2^3 3^2 5$. One can easily show that for any odd prime N the periods of the trajectories starting from initial points x=0, x=1, and x=N−1 are always 4, 1, 2 respectively.

Section 12: Software implementation. In a public-key algorithm encryption, decryption, signing, and verifying signatures all involve multiplying with a large number. An algorithm for computing $T_p(x) \pmod{N}$ when N and p are large numbers is now presented.

Equation (6) can be rewritten as $$\begin{bmatrix} T_p \\ T_{p+1} \end{bmatrix} = \begin{bmatrix} 0 & 1 \\ -1 & 2x \end{bmatrix} \cdot \begin{bmatrix} T_{p-1} \\ T_p \end{bmatrix} = A \cdot \begin{bmatrix} T_{p-1} \\ T_p \end{bmatrix} \quad (10)$$

or, after some algebra, as $$\begin{bmatrix} T_p \\ T_{p+1} \end{bmatrix} = A^p \cdot \begin{bmatrix} T_0 \\ T_1 \end{bmatrix} \quad (11)$$

Matrix exponentiation can be done effectively by the square and multiply algorithm. Using notation $$I = \begin{bmatrix} 1 & 0 \\ 0 & 1 \end{bmatrix}$$

the algorithm in pseudo-C language for calculating the matrix exponent $A^p$ is:

$A^p=I;$ for $(i=p.\text{numBits}( ); i>0; i--)$
$\{A^p=(A^p)^2;$ if $(p.\text{bitAt}(i)==1) A^p=A^pA;\}$.

More in detail, an auxiliary matrix $A^p$ is preliminarily set equal to the identity matrix. The quantity p.numBits( ) is the number of bits of the binary string representing the number p. An iterative cycle begins: a pointer "i" is initially equal to p.numBits( ) and is decreased at each iteration step until it nullifies. During each iteration step, the auxiliary matrix is powered to an exponent 2 and it is to be checked whether the i-th least (or most) significant bit of the binary string representing the number p equals 1 or not: if this condition is verified, the auxiliary array is multiplied by the matrix A and a successive iteration step is performed if i>0. When the iterative cycle ends, the auxiliary matrix is the exponent matrix to be calculated.

This algorithm is a version of the number exponentiation algorithm used in commercial asymmetric encryption algorithms, adapted to work on matrices.

The $T_p(x) \pmod{N}$ calculation speed has been tested on Intel Pentium 1700 MHz processor with 512 MB RAM, using the equation (5). The test includes Java [30] and GNU Multiple Precision library [31] implementation. For N and p of order 1024 bits, calculating $T_p(x) \pmod{N}$ takes Java: ~700 ms GMP: ~70 ms.

Section 13: ElGamal-like public-key encryption with modified Chebyshev polynomials. The ElGamal public-key encryption scheme can be viewed as a Diffie-Hellman key agreement in key transfer-mode [8]. Its security is based on the intractability of the discrete logarithm-problem and the Diffie-Hellman problem. The basic ElGamal and generalized ElGamal encryption schemes are described in [8].

Another encryption process of this invention is obtained by generalizing the ElGamal encryption scheme for using modified Chebyshev polynomials of Eq. (9). The ElGamal-like public-key encryption process of this invention comprises an algorithm for key generation and an algorithm for encrypting/decrypting a message.

Algorithm for key generation. A recipient should perform the following operations:

1. Choosing a large random prime N and an integer x such that x<N.
2. Choosing a random integer s<N and computing $A = T_s(x) \pmod{N}$.
3. The recipient's public key is (x, N, A), while his private key is s.

Algorithm for ElGamal-like public-key encryption. 1. Encryption. To encrypt a message m, a sender should perform the following operations:

(a) Obtaining the recipient's authentic public key (x, N, A).
(b) Encoding the message as an integer m in the range {0, 1, ..., N−1}.
(c) Selecting a random integer r<N.
(d) Computing $B = T_r(x) \pmod{N}$ and $X = mT_r(A) \pmod{N}$.
(e) Sending the cipher-text c=(B, X) to Alice.

2. Decryption. To recover the message m from c, the recipient should perform the following operations:

(f) Using the private key s to compute $C = T_s(B) \pmod{N}$.
(g) Recovering m by computing $m = XC^{-1} \pmod{N}$.

Proof that decryption works. It follows from the fact that $$T_s(B) = T_s(T_r(x)) = T_r(T_s(x)) = T_r(A)$$

The just described encryption process may be easily generalized by choosing preliminarily an invertible parametric function $q_{par}(.)$ defined almost everywhere on the phase space (that is, the set of eventual singular points of this parametric function does not have any accumulation point) in function of the parameter par, then encrypting a message performing the step (d) calculating the variable X as follows:

$$X = q_{T_r(A)}(m) \pmod{N}$$

The recipient recovers the message m by performing the step (g) using the following formula:

$$m = q_{T_s(B)}^{-1}(X) \pmod{N}$$

wherein $q_{par}^{-1}(.)$ is the inverse of the parametric function $q_{par}(.)$. The parametric function may be the product between the argument of the function by its parameter as in the embodiment presented above, or alternatively it may be the sum or the ratio between the argument of the function by its parameter, or any other invertible parametric function.

An example of application of the described encryption process with artificially small parameters is presented below.

Key generation. Alice chooses the prime N=1749940627, integers x=25749480 and s=7207480595, and computes A=173359085. Alice's public key is (N=1749940627, x=25749480, A=173359085), while her private key is s=7207480595.

Encryption. To encrypt a message m=11223344, Bob chooses an integer r=6431562606 and computes B=1399079193 and X=878048528. He sends the cipher text c=(B, X)=(1399079193, 878048528) to Alice. Decryption. To recover the message m from c, Alice computes C=1376040233 and m=11223344.

Security. If x>1, the Chebyshev polynomial $T_n(x)$ can be written as $$T_n(x) = \cos h(n \cos h^{-1}(x))$$

Thus, if $y=T_n(x) \pmod{N}$, then, after some algebra, one finds $$n = \log_{x+\sqrt{x^2-1}}(y+\sqrt{y^2-1})$$

In the case where both square roots $\sqrt{x^2-1}$ and $\sqrt{y^2-1}$ exist in GF(N), which is the Galois field of order N, one has a conventional discrete logarithm problem. On the other hand, if at least one of the square roots exists in the quadratic extension field $GF(N^2)$, this leads to a quadratic extension field generalization of the discrete logarithm problem. Thus, the modified ElGamal public-key algorithm of this invention is as secure as the original ElGamal algorithm.

Section 14: RSA-like public-key encryption with modified Chebyshev polynomials. The RSA-like encryption process, named after its inventors R. Rivest, A. Shamir, and L. Adleman, is the most widely used public-key encryption process. It may be used to provide both secrecy and digital signatures and its security is based on the intractability of the integer factorization problem.

This section describes a RSA-like encryption process according to this invention for Chebyshev polynomials. As for the RSA encryption process, the encryption process presented below can be used for both encryption and digital signature and its security is based on the intractability of the integer factorization problem.

The RSA-like public-key encryption process of this invention comprises an algorithm for key generation and an algorithm for encrypting/decrypting a message.

Algorithm for key generation. A recipient should perform the following operations:

1. Choosing two large random (and distinct) primes p and q, roughly of the same size.
2. Computing N=pq and $\phi=(p^2-1)(q^2-1)$.
3. Selecting a random integer e, $1<e<\phi$, such that "e" and "$\phi$" are coprime integers, that is $\gcd(e, \phi)=1$.
4. Computing the unique integer d, $1<d<\phi$, such that $ed \equiv 1 \pmod{\phi}$.
5. The recipient's public key is (N, e); the recipient's private key is d.

Algorithm for encryption. 1. Encryption. To encrypt a message m, a sender should perform the following operations:

(a) Obtaining the recipient's authentic public key (N, e).
(b) Encoding the message in an integer in the interval [1, N−1].
(c) Computing $c=T_e(m) \pmod{N}$ according to Eq. (9) and sending it to the recipient.

2. Decryption. To recover the message m from c, the recipient should perform the following operation:

(d) Using the private key d to recover $m=T_d(c) \pmod{N}$.

The integers e and d in RSA key generation are called the encryption exponent and the decryption exponent, respectively, while N is called the modulus.

Proof that decryption works.—It was shown in Section 11 that if p is an odd prime number and $0 \leq g<p$, then the period of the sequence $T_n(g) \pmod{p}$, n=0, 1, . . . is a divisor of $p^2-1$. Since $ed \equiv 1 \pmod{\phi}$, there is an integer k such that $ed=1+k\phi$. Thus, one finds $$T_d(T_e(x)) \equiv T_{de}(x) \equiv T_{1+k\phi}(x) \equiv T_1(x) \equiv x \pmod{p}$$

By the same arguments, $$T_d(T_e(x)) \equiv T_{de}(x) \equiv T_{1+k\phi}(x) \equiv T_1(x) \equiv x \pmod{q}$$

Finally, since p and q are distinct primes, it is possible to use Chinese remainder theorem to show that $$T_d(T_e(x)) \equiv T_{de}(x) \equiv T_{1+k\phi}(x) \equiv T_1(x) \equiv x \pmod{N}.$$

An example of application of this algorithm with artificially small parameters is presented below.

Key generation. Alice chooses the primes p=21787 and q=3793 and computes N=82638091 and $\phi=6829053595064064$. Alice chooses e=65537 and, using the extended Euclidean algorithm, finds d=2150406320724737. Alice's public key is the pair (N=82638091, e=65537), while her private key is d=2150406320724737.

Encryption. To encrypt a message m=11223344, Bob computes $$c=T_{65537}(11223344) \pmod{82638091} = 12355612$$

Decryption. To decrypt c, Alice computes $$T_d(c) \pmod{N} = T_{2150406320724737}(12355612) \pmod{82638091} = 11223344$$

Like the well known RSA and ElGamal encryption processes, digital signature processes for both the RSA-like and the ElGamal-like encryption processes of this invention may be realized. For example, the digital signature process for public-key encryption processes already disclosed in Section 2 may be used.

Section 15: Ideal theory in quadratic fields. In this section the ideal theory in quadratic fields is briefly summarized following [27, 28]. Quadratic integers—The solutions of the linear equations with integral coefficient, ax+b=0, form the field of rational numbers. If the leading coefficient is equal to 1, a=1, the solutions are integers. Following Dedekind, quadratic irrationals are defined as the solutions of quadratic equations with integral coefficients, whereas quadratic equations whose leading coefficient is 1 yield quadratic integers. Thus $(1+\sqrt{5})/2$ and 2i are quadratic integers, since they satisfy the equations $x^2-x-1=0$ and $x^2+4=0$, respectively. Quadratic integers coincide with the eigenvalues of 2 by 2 integral matrices. Sometimes, when possibility of confusion arises, ordinary integers will be called rational integers.

Norm, units and primes—By analogy with complex conjugates, the conjugate of a quadratic irrational $z=(a+b\sqrt{D})/c$ is defined as $z'=(a-b\sqrt{D})/c$. The number $zz'=N(z)$ is called norm of z. Then $N(z)=N(z')$ and $N(zv)=N(z)N(v)$. In real fields, the norm of the number has nothing to do with its actual magnitude, and can be even negative. The norm of a quadratic integer is a rational integer.

The divisors of all rational integers are just 1 and −1, which are called units. The units of a quadratic field are precisely those quadratic integers of the field having unit norm. In real fields there is an infinity of units, forming a cyclic multiplicative group. So every unit can be expressed as a power of the generator of the group, which is called the fundamental unit. For instance, the golden mean $(1+\sqrt{5})/2$ and $2143295+221064\sqrt{94}$ are fundamental units in their respective fields.

A quadratic integer z that is not a unit is called a prime if a factorization z=uv is possible only when one of the two factors is a unit. For instance, $z=2+\sqrt{7}$ is a prime. Then one would hope that any integer can be factored in essentially only one way as product of primes. The richness and difficulty of the arithmetic of quadratic integers depends largely on the fact that unique factorization generally fails.

Quadratic residues—The values of a for which the congruence in x, $$x^2 \equiv a \pmod{p} \quad (12)$$

is solvable are called quadratic residues of the odd prime p. The quadratic residue character is denoted by the Legendre symbol (a/p) [also written (a/p)], $$\begin{aligned} \left(\frac{a}{p}\right) &= 1, \quad \text{if } x^2 \equiv a \pmod{p} \text{ solvable and } \gcd(a, p) = 1 \\ \left(\frac{a}{p}\right) &= 0, \quad \text{if } \gcd(a, p) = p \\ \left(\frac{a}{p}\right) &= -1, \quad \text{if } x^2 \equiv a \pmod{p} \text{ unsolvable} \end{aligned} \quad (13)$$

Thus, $[1+(a/p)]$ is the number of solutions to the equation (12) for any a.

Modules—A module is defined as a set of quantities closed under addition and subtraction. Thus, when a module contains an element $\xi$, it contains 0 ($=\xi-\xi$) as well as negatives $-\xi$ ($=0-\xi$) and integral multiplies ($\xi+\xi$ written as $2\xi$, $\xi+\xi+\xi$ written as $3\xi$, etc). Capital letters M, N, D, etc., are used to denote modules. Combinations of a finite set of vectors $V_i$ is considered $$u = x_1 V_1 + x_2 V_2 + \ldots + x_s V_s \quad (14)$$

where the coefficients $x_i$ range over all integers. The set of those u forms a module M and the vectors $V_i$ are called a basis of the module, written $$M = [V_1, V_2, \ldots, V_s]$$

Field—A field is a set of quantities taken from the complex numbers closed under the rational operations, namely addition, subtraction, multiplication, and division (excluding division by zero). In quadratic number theory, the considered field is taken to be the set of surds $(a+b\sqrt{D})/c$ for a, b, c integral, D fixed and not a perfect square, and $c \neq 0$. It can be seen that addition, subtraction, multiplication, and division of such quantities lead to quantities of the same form. This field is written symbolically as $R(\sqrt{D})$ meaning that the set of surds is generated by adjoining $\sqrt{D}$ to the rationals. The field $\sqrt{D}$ is called a field over rationals. From D is extracted its (positive or negative) square-free kernel $D_0$, so that $D=m^2 D_0$. Note that $\sqrt{D}$ and $\sqrt{D_0}$ generate the same field. Let us define:

$$\omega_0 = \begin{cases} \sqrt{D_0}, & \text{if } D_0 \not\equiv \mod(4) \\ \dfrac{1+\sqrt{D_0}}{2}, & \text{if } D_0 \equiv \mod(4) \end{cases} \quad (15)$$

Thus, the basis of quadratic integers in $R(\sqrt{D})$ is $[1, \omega_0]$. This module is designated by the symbol $D=[1,\omega_0]$. For example, the basis of $R(\sqrt{2})$ is $[1, \sqrt{2}]$, the basis of $R(\sqrt{5})$ is $\lfloor 1,(1+\sqrt{5})/2 \rfloor$, while $R(\sqrt{8})$ has the same basis as $R(\sqrt{2})$. In general, the field $R(\sqrt{m^2 D_0})$ is independent of m, and so D and its basis.

The rational integer d, defined as $$d = \begin{cases} D_0, & \text{if } D_0 \equiv \mod(4) \\ 4D_0, & \text{if } D_0 \not\equiv \mod(4) \end{cases} \quad (16)$$

is called a field discriminant. All numbers sharing the same discriminant d form a field.

Integral domain—A set of quantities taken from complex numbers which is closed under addition, subtraction, and multiplication (ignoring division) is called a ring. If a ring contains the rational integers, it is called an integral domain. The quadratic integers of a fixed field $R(\sqrt{D_0})$ form a domain which will be referred as D.

If the integral domain D of all quadratic integers of $R(\sqrt{D})$ contains an integral domain D* which does not consist wholly of rationals, then D* is characterized by some fixed positive rational integer n as the set of integers of D which are congruent to a rational integer modulo n. The integral domain D* corresponding to n is written $D_n$. Thus $D_1=D$. Note also that $D_n=[1,n\omega_0]$.

Ideals—Let us start with $D_n$, a quadratic integral domain. An ideal A in $D_n$ is defined as a module in $D_n$ with a special property that if $\alpha, \beta \in A$ and $\xi \in D_n$, then $\alpha \pm \beta \in A$ (property valid for modules), and $\alpha \xi \in A$ (property distinguishing ideals). Starting with $\alpha$, a fixed element of $D_n$, the principal ideal in $D_n$ is defined as follows $$A = (\alpha)$$

as the set of $\alpha\xi$ where $\xi \in D_n$. The ideal (1) is called the unit ideal. The sum of ideals is defined as the ideal $A+B=\{\alpha+\beta\}$, where $\alpha \in A$ and $\beta \in B$. The product of two ideals A and B is defined as the ideal C "generated by all products" $\alpha\beta$. Let us say ideal A divides ideal C in $D_n$ (or A|C) if and only if an ideal B exists in $D_n$ for which C=AB.

An indecomposable ideal in $D_n$ is an ideal Q in $D_n$ other than the unit ideal, which has no ideal in $D_n$ as divisor other than Q and $D_n$. The integral domain $D_1$, has unique factorization into indecomposables if and only if all ideals are principals.

A prime ideal in $D_n$ is an ideal P in $D_n$ other than the unit ideal, with the property that for any two ideals in $D_n$, A and B, if P|AB, then P|A or P|B. Every prime ideal P belongs to a rational prime p determined uniquely by $P|_{(p)}$.

The rational prime p factors in the quadratic field $R(\sqrt{D})$, (D is a square-free integer), according to the following rules based on d, the discriminant of the field, and (d/p), the Kronecker symbol:

$$\begin{aligned} (p) &= (p) & \text{or } p \text{ is inert (does not factor)} & \quad \left(\frac{d}{p}\right) = -1 \\ & & \text{if and only if} & \\ (p) &= P_1 P_2 & \text{or } p \text{ splits into two different} & \quad \left(\frac{d}{p}\right) = 1 \\ & & \text{factors if and only if} & \\ (p) &= P^2 & \text{or } p \text{ ramifies if and only if} & \quad \left(\frac{d}{p}\right) = 0 \end{aligned} \quad (17)$$

Section 16: Dynamics and arithmetics. In this section arithmetic properties of torus automorphisms following [26] are briefly summarized. Consider the dynamics of the following map:

$$\begin{bmatrix} x_{n+1} \\ y_{n+1} \end{bmatrix} = \begin{bmatrix} 0 & 1 \\ -1 & k \end{bmatrix} \begin{bmatrix} x_n \\ y_n \end{bmatrix} (\text{mod } N) \qquad (18)$$

where x, y, k are integers and N is prime. Let us assume that $0<x_0, y_0<N$ and $2<k<N$.

Let us consider a fixed value of the trace k, and let $$\lambda = \frac{k + \sqrt{k^2 - 4}}{2}$$

be the eigenvalue of the matrix in the equation (18). This determines a integral domain $D_1$ to which the eigenvalue belongs. Let d be the filed discriminant, i.e., $d=D_0\equiv(\text{mod } 4)$ or $d=4D_0\not\equiv(\text{mod } 4)$, where $D_0$ is the square-free kernel of $k^2-4$.

Consider now the unit ideal in $D_1$ (i.e., $D_1$ itself): $D_1 = (1) = [1, \omega_0]$, where $\omega_0$ is given by equation (15). Multiplying this ideal by $\lambda$ the same ideal is obtained, but with different basis. Its elements are integral linear combinations of the basis elements 1 and $\omega_0$, given by the equation $$\lambda[1,\omega_0] = [m_{11}+\omega_0 m_{21}, m_{12}+\omega_0 m_{22}]$$

where the numbers $m_{ij}$ are rearranged as a matrix:

$$M' = \begin{bmatrix} m_{11} & m_{21} \\ m_{12} & m_{22} \end{bmatrix} \qquad (19)$$

Since $\lambda$ is a unit of norm +1, the matrix M' is strictly unimodular (its determinant is equal to +1). Let us identify the point $(x, y) \in Z^2$ with $z=x+y\omega_0$, i.e. z is a quadratic integer in the ideal (1). From Eq. (19) one obtains $$\lambda z = \lambda x + \lambda y \omega_0 = x' + y'\omega_0.$$

One can see that multiplication by $\lambda$ corresponds to the action of the transpose M of M' on $Z^2$: M (x, y)=(x', y'). In constructing the matrix M from Eq. (19), the largest solution $\lambda$ of the equation $\lambda^2-k\lambda+1=0$ has been used. This choice is not restrictive, since the smallest solution $\lambda'$, which is conjugate to $\lambda$, would just correspond to the inverse matrix $M^{-1}$, as easily verified. Note also that one can derive an explicit expression for M. Let $k^2-4=m^2D_0$, and $D_0$ be a square-free kernel. Thus for k odd, M reads:

$$M = \begin{bmatrix} h & (h^2+mh-1)/m \\ m & h+m \end{bmatrix}$$

where h=(k-m)/2, while for k even, M reads:

$$M = \begin{bmatrix} h & (h^2-1)/m \\ m & h \end{bmatrix}$$

where h=m/2.

The properties of the orbits generated by M are now determined for each value of k, a task which is greatly simplified by the choice of identifying $Z^2$ with the unit ideal in $D_1$. Then, one can determine the properties of the orbits generated by other 2 by 2 matrices with integer entries and determinant +1. It turns out, however, that the orbit structure depends to a great extent on the eigenvalue $\lambda$ alone, which depends only on one parameter, the trace k.

In order to take into account the periodicity of the torus, a "two-dimensional" modular arithmetic is used, identifying quadratic integers which differ by elements of the ideal $(N)=[N, N\omega_0]$. In other words, the points of square lattices with side N are identified. To do so a generalization of the concept of congruence is needed, since if $z=x+y\omega_0$ both x and y must be taken modulo N. Let us say that two quadratic integers v, z are congruent module an ideal A, and write $v \equiv z(\text{mod } A)$, if v-z is contained in A.

The period of an orbit through the point (x, y) is given by the smallest integer T satisfying the congruence $$\lambda^T z \equiv (\text{mod}(N)), z=x+y\omega_0.$$

Note that since $\lambda$ is a unit, $(\lambda)A=A$ for any ideal A; thus, A is an invariant sublattice of $Z^2$. On the other hand, since one performs arithmetic modulo (N), the only invariant ideals on the torus are divisors of (N). To perform the ideal factorization of (N) (if N is an integer), its rational prime factors are first determined, $N=p_1p_2 \ldots p_n$, where $p_i$ are rational primes. This corresponds to the ideal factorization $(N)=(p_1)(p_2) \ldots (p_n)$. However, in the considered case N is a prime number. Below, an orbit which belongs to some ideal factor of (N) different from (1) is referred as an ideal orbit, otherwise it is referred as a free orbit. Below results proved in [26] are stated.

1. If $(d/N)=-1$, (N) is inert. All orbits are free and have the same period T, which is a divisor of N+1. If $T=(N+1)/m$, then there are m(N-1) free orbits.
2. If $(d/N)=-1$, (N) splits. All orbits have the same period T, which is divides N-1. If $T=(N-1)/m$, then there are m(N-1) free orbits and 2m ideal orbits.
3. If $(d/N)=-1$, (N) ramifies. The periods of orbits are computed as follows. Let $\lambda=(k+b\sqrt{D_0})$ (with k and b both even if $D_0\not\equiv1(\text{mod } 4)$). Two cases are possible:

3a. If $k\equiv2(\text{mod } N)$, there are N-1 ideal fixed points, and N-1 free orbits of period N.

3b. If $k\equiv-2(\text{mod } N)$, there are (N-1)/2 ideal orbits of period 2, and (N-1)/2 free orbits of period 2N.

Section 17: Proof of the theorem 2. In this section a proof of the theorem 2 is given. Consider the following matrix:

$$C = \begin{bmatrix} 0 & 1 \\ -1 & 2g \end{bmatrix}$$

Its largest eigenvalue is $\lambda=g+\sqrt{g^2-1}$. Let $g^2-1=m^2D_0$, where $D_0$ is square free kernel. Let us define an integer d as follows $$d = \begin{cases} D_0, & \text{if } D_0 \equiv (\text{mod} 4), \\ 4D_0, & \text{if } D_0 \not\equiv (\text{mod} 4). \end{cases}$$

The proof of the theorem 2 follows directly from the following theorem:

Let N be an odd prime and $g \in Z$ such that $0 \leq g < N$. Let T be the period of the sequence $T_n(g)(\text{mod } N)$, for $n=0,1,2,\ldots$:

(i) if $x^2 \equiv d(\text{mod } N)$ is solvable, then T is a divisor of N-1; otherwise, (ii) if $x^2 \equiv d(\text{mod } N)$ is unsolvable, then T is a divisor of N+1.

The proof of this theorem, however, follows from the results of the previous Section 16 if $g \geq 2$. Only the cases g=0 and g=1 must be considered. As mentioned in the Section 11 the periods of the trajectories starting from initial points g=0 and g=1 are always 4 and 1, respectively. Thus, for all odd primes N, the period of the sequence $T_n(g)(\text{mod } N)$, is a divisor of $N^2-1$.

REFERENCES

[1] L. M. Pecora and T. L. Carroll, "Synchronization in chaotic system", Phys. Rev. Lett., Vol. 64, pp. 821–824, (1990).
[2] G. Kolumban, M. P. Kennedy, G. Kis, Z. Jako, "FM-DCSK: a novel method for chaotic communications", ISCAS '98. Proceedings of the 1998 IEEE International Symposium on Circuits and Systems, Volume: 4, Page(s): 477–480, (1998).
[3] M. Sushchik, N. Rulkov, L. Larson, L. Tsimring, H. Abarbanel, K. Yao, A. Volkovskii, "Chaotic pulse position modulation: a robust method of communicating with chaos", IEEE Communications Letters, Volume: 4 Issue: 4, Page(s): 128–130, (2000).
[4] L. Kocarev, "Chaos-Based Cryptography: a Brief Overview," IEEE Circuits and Systems Magazine, Volume 1, Issue 3, pp. 6–21, (2001).
[5] F. Dachselt and W. Schwarz, "Chaos and cryptography", IEEE Transactions on Circuits and Systems I: Fundamental Theory and Applications, Volume: 48 Issue: 12, pp: 1498–1509, (2001).
[6] M. P. Kennedy, G. Kolumban, G. Kis, Z. Jako, "Performance evaluation of FM-DCSK modulation in multipath environments", IEEE Transactions on Circuits and Systems I: Fundamental Theory and Applications, Volume: 47 Issue: 12, Page(s): 1702–1711, (2000).
[7] N. F. Rulkov, M. M. Sushchik, L. S. Tsimring, and A. R. Volkovskii, "Digital Communication Uisng Chaotic Pulse Position Modulation", IEEE Transactions on Circuits and Systems I: Fundamental Theory and Applications, Volume: 48 Issue: 12, Page(s): 1436–1444, (2001).
[8] A. Menezes, P. van Oorschot, and S. Vanstone, *Handbook of Applied Cryptography*, CRC Press, 1997.
[9] F. Pichler and J. Scharinger, "Finite dimensional generalized Baker dynamical systems for cryptographic applications", Lect. Notes in Comput. Sci., vol. 1030, pp. 465–476, (1996).
[10] J. Fridrich, "Symmetric ciphers based on two-dimensional chaotic maps", Int. J. Bifurcation and Chaos, Volume 8, Issue 6, Pages: 1259–1284, (1998).
[11] N. Masuda and K. Aihara, "Cryptosystems with discretized chaotic maps", IEEE Transactions on Circuits and Systems I: Fundamental Theory and Applications, Volume: 49 Issue: 1, Pages: 28–40, (2002).
[12] R. A. J. Matthews, "On the Derivation of a 'Chaotic' Encryption Algorithm", Cryptologia, vol. 13, pp. 29–42, (1989); D. D. Wheeler, "Problems with Chaotic Cryptosystems", Cryptologia, vol. 13, pp. 243–250, (1989); D. D. Wheeler and R. A. J. Matthews, "Supercomputer Investigations of a Chaotic Encryption Algorithm", Cryptologia, vol. 15, no. 2, pp. 140–152, (1991).
[13] T. Kohda and A. Tsuneda, "Statistics of Chaotic Binary Sequences", IEEE Transactions on Information Theory, Volume: 43, Pages: 104–112, (1997).
[14] C. S. Petrie and J. A. Connelly, "A noise-based IC random number generator for applications in cryptography", IEEE Transactions on Circuits and Systems I: Fundamental Theory and Applications, Volume: 47 Issue: 5, Page(s): 615–621, (2000).
[15] A. Gerosa, R. Bernardini, and S. Pietri, "A fully integrated chaotic system for the generation of truly random numbers", IEEE Transactions on Circuits and Systems I: Fundamental Theory and Applications, Volume: 49 Issue: 7, Page(s): 993–1000, (2002).
[16] L. Kocarev, T. Stojanovski, G. G. Rizzotto, F. Italia and D. Porto, "Method for generating a random number sequence and a relative random bit generator," European Patent Application No. 01830764.5-1243 (EP 1 320 026), Date of filing: 13 Dec. 2001.
[17] L. Kocarev, G. Jakimoski, G. G. Rizzotto, and P. Amato, "Chaos-based block encryption," European Patent Application No. 01130846.7-1525 (EP 1 326 363), Date of filing: 27 Dec. 2001.
[18] L. Kocarev, P. Amato, and G. G. Rizzotto, "Method of generating a chaos-based pseudo-random sequence and a hardware generator of chaos-based pseudo random bit sequences" European Patent Application No. 02425689.3; Date of filing: 12 Nov. 2002.
[19] L. Kocarev, Z. Tasev, P. Amato, and G. G. Rizzotto, "Encryption process employing chaotic maps and digital signal process," European Patent Application No. 03425219.7-1237; Date of filing: 7 Apr. 2003.
[20] L. Kocarev and Z. Tasev, "Public-key encryption based on Chebyshev maps", 2003 IEEE International Symposium on Circuits and Systems, May 25–May 28, 2003, Bangkok, Thailand, ISCAS 2003, accepted for publication.
[21] L. Kocarev, Z. Tasev, and J. Makraduli, "Public-Key Encryption and Digital-Signature Schemes Using Chaotic Maps", 16th European Conference on Circuits Theory and Design, Sep. 1–Sep. 4, 2003, Krakow, Poland, ECCTD 2003, accepted for publication. [22] C. E. Shannon, "Communication theory of secrecy systems", Bell Systems Technical Journal, vol. 28, pp. 656–715, (1949).
[23] C. E. Shannon, Bell Systems Technical Journal 27, 379 (1948); 27, 623 (1948).
[24] W. Diffie and M. E. Hellman, "New directions in cryptography", IEEE Trans. of Information Theory, Volume 22, pp. 644–654, (1976).
[25] T. J. Rivlin, *Chebyshev polynomials*, John Wiley and Sons, Inc., New York, 1990.
[26] I. Percival and F. Vivaldi, "Arithmetical properties of strongly chaotic motions", Physica D, vol. 25, no. 1–3, pp. 105–130, (1987).
[27] H. Cohn, *A second course in number theory*, John Wiley & Sons, Inc., New York, 1962.
[28] H. Hasse, *Number theory*, Springer-Verlag, Berlin, 2002.
[29] D. E. Knuth, *The Art of Computer Programming*, Reading, Mass.: Addison Wesley, 1998, vol. 2.
[30] http://java.sun.com.
[31] www.swox.com/gmp/.
[32] T. Kohda and H. Fujisaki, "Jacobian elliptic Chebyshev rational maps", Physica D 148, 242 (2001).
[33] R. L. Devaney, "An Introduction to Chaotic Dynamical Systems", Benjamin/Cummings, New York, 1984.

That which is claimed is:

1. An encryption process comprising:
choosing a secret key and a set of permutable functions defined on a phase space for encrypting/decrypting messages; and
choosing a code for encoding messages to be sent as a number belonging to the phase space, the set of permutable functions comprising chaotic maps generated by a composite function of first and second functions and an inverse of the first function, with the secret key being defined by the second function.

2. An encryption process according to claim 1, wherein the chaotic maps comprise Chebyshev polynomial maps having an order that is an integer greater than or equal to 2 and the phase space is an interval, with the order being the secret key.

3. An encryption process according to claim 2, wherein images of recipient or sender chaotic maps are calculated by:
a) factoring an order of the Chebyshev map for obtaining a list of its prime factors and a list of their relative exponents;
b) applying iteratively a Chebyshev map having an order that is a first value of the list of prime factors, for a number of times equal to the exponent thereof;
c) repeating iteratively step b) in which a degree of the Chebyshev map is the remaining values of the list of prime factors; and
d) a result of the last iteration is the image to be calculated.

4. An encryption process according to claim 1, wherein the chaotic maps comprise Chebyshev polynomial maps, and an order of the Chebyshev polynomial maps is a power of an integer base raised to an integer exponent, with the integer exponent being the secret key.

5. An encryption process according to claim 1, wherein the chaotic maps comprise a combination of Chebyshev polynomial maps and powers, defined by the formula $$\cos \lfloor (\cos^{-1}(y)+2)^p - 2 \rfloor$$

with the parameter (p) being an integer greater than or equal to 2, and the phase space being an interval [−1, 1].

6. An encryption process according to claim 1, wherein the chaotic maps are defined by the formula $$\lfloor (y+1)^p - 1 \rfloor \mod 1$$

with the parameter (p) being an integer greater than or equal to 2, and the phase space being an interval [0, 1].

7. An encryption process according to claim 1, wherein the chaotic maps are modified chaotic maps generated by a composite function, an image of which is a calculated modulo that is a pre-established integer.

8. An encryption process according to claim 7, wherein the chaotic maps are equivalent to respective torus automorphisms defined as modular iterative vector maps, and an integer value of a state vector is obtained after a certain number of iteration steps by performing the following:
calculating a dot product between a value of the state vector at a previous step and a certain matrix having a determinant that is ±1; and
calculating an integer remainder of the dot product modulo that is the pre-established integer.

9. An encryption process according to claim 8, wherein components of any space vector are within an interval [0, 1], with the pre-established integer being 1, and the certain matrix being an arbitrary 2x2 matrix with integer components.

10. An encryption process according to claim 9, wherein a component of a first row of an initial state vector of the modular iterative vector map is 1, and a respective component of a second row is a number within in the interval [0, 1].

11. An encryption process according to claim 8, wherein components of any space vector are non-negative integers less than the pre-established integer (N).

12. An encryption process according to claim 8, wherein the pre-established integer is a prime number, and the certain matrix is an arbitrary 2x2 matrix with integer components.

13. An encryption process according to claim 7, wherein the chaotic maps are modified Chebyshev polynomial maps defined by the pre-established integer, and an order of the Chebyshev polynomial maps is an integer greater than or equal to 2.

14. An encryption process according to claim 1, further comprising:
a sender sending a message by performing the following:
choosing an invertible second function as a sender private key so that a corresponding chaotic map belongs to the set of permutable chaotic maps, and
encrypting an encoded message to be sent by calculating an image thereof through the chaotic map using the sender private key;
a recipient receiving the encrypted message and performing the following:
choosing an invertible second function as a recipient private key so that a corresponding chaotic map belongs to the set of permutable chaotic maps,
encrypting the received encrypted message by calculating the image thereof through the chaotic map using the recipient private key, and
sending back to the sender the twice encrypted message;
the sender receiving the twice encrypted message and performs the following:
decrypting the twice encrypted message using the sender first private key, and
sending the resulting encrypted message to the recipient; and
the recipient obtains the original message by decrypting the received encrypted message using the recipient private key.

15. An encryption process according to claim 1, further comprising defining a public key for encrypting messages to be sent.

16. An encryption process according to claim 15, wherein defining the public key comprises choosing an invertible parametric function defined almost everywhere on the phase space; and wherein a recipient of the message performs the following:
choosing an invertible second function as a recipient private key so that a corresponding chaotic map belongs to a set of permutable chaotic maps, and
choosing a random number belonging to the phase space, and
calculating an image of the random number through the recipient chaotic map, a pair formed by the random number and an image thereof being a recipient public-key;
a sender of the message performs the following:
encoding the message to be transmitted by the code and generating the number (M),
choosing an invertible second function as a sender private key so that the corresponding chaotic map belongs to the set of permutable chaotic maps, and
calculating the images of the random number through the sender chaotic map and through a combination of the recipient and sender chaotic maps, and
sending to the recipient a pair or values, a first value of the pair being the image through the sender chaotic map while a second value of the pair is calculated by applying the parametric function to the number (M) using as a parameter the image through a combination of the recipient and sender chaotic maps;

the recipient decrypting the message by performing the following:

calculating the image through the recipient chaotic map of the first value of the pair, obtaining the number (M) and applying an inverse of the parametric function to the second value of the pair using as a parameter the image through the recipient chaotic map of the first value of the pair, and recovering the original message by decoding the number (M) with the pre-established code.

17. An encryption process according to claim 16, wherein the image of the parametric function comprises at least one of the following: a product between an argument of the function by the parameter thereof, a ratio between the argument of the function by the parameter thereof, and a sum between the argument of the function and the parameter thereof.

18. An encryption process according to claim 16, wherein a sender performs the following operations:

generating a public key, with a first integer number (a) being the order of the chaotic map ($T_a(.)$), generating a second integer number (k) and calculating a second image of the random number (x) through the chaotic map ($T_k(.)$) having an order that is the second integer number (k), generating a verification number (h), choosing a first test function $V_1(.)$, a second test function $V_2(.)$ and a third test function $H(.)$ such that $$V_1(T_a(x),T_k(x),H(h,T_k(x),k,a),x)=V_2(h,T_k(x),H(h,T_k(x),k,a),x);$$

generating a second verification number (s) according to the formula $$s=H(h,T_k(x),k,a),$$

sending the pair ($T_k(x)$, s) formed by the second image ($T_k(x)$) and the second verification number (s) as a signature of a message (M); a recipient performs the following operations:

obtaining an authentic sender public key (x, $T_a(x)$);

calculating a first test value ($v_1$) using the first test function $V_1(.)$ according to the formula $$v_1=V_1(T_a(x),T_k(x),s,x),$$

calculating a second test value ($v_2$) using the second test function $V_2(.)$ and the verification number (h) according to the formula $$v_2=V_2(h,T_k(x),s,x), \text{ and}$$

verifying whether the test values first ($v_1$) and second ($v_2$) are identical.

19. An encryption process according to claim 18, further comprising choosing a hash function (h(.)) defined on the phase space, wherein the first verification number (h) is the image of the message (M) through the hash function (h(.)).

20. An encryption process according to claim 18, further comprising:

defining first $g_1(.)$ and second $g_2(.)$ auxiliary functions such that $g_1(h,T_k(x))\cdot k=g_2(s)\cdot a$;

a first test value ($v_1$) being the image of the random number (x) through the chaotic map according to the formula $v_1=T_{g_2(s)}(T_a(x))$;

a second test value ($v_2$) being the image of the random number (x) through the chaotic map according to the formula $v_2=T_{g_1(h,T_k(x))}(T_k(x))$; and wherein the chaotic maps comprise Chebyshev polynomial maps, and an order of the Chebyshev polynomial maps comprises at least one of the following: an order that is an integer greater than or equal to 2 and the phase space is an interval with the order being the secret key; and the order is a power of an integer base raised to an integer exponent, with the integer exponent being the secret key.

21. An encryption process according to claim 20, wherein the first auxiliary function ($g_1(.)$) returns the verification number (h), the second auxiliary function ($g_2(.)$) is the identity function, and the second verification number (s= (h·k)/a) is a ratio between a product of the first verification number (h) by the second integer number (k), and the private key (a) of the sender.

22. An encryption process according to claim 20, wherein the chaotic maps comprise Chebyshev polynomial maps, and an order of the Chebyshev polynomial maps comprises at least one of the following: an order that is an integer greater than or equal to 2 and the phase space is an interval with the order being the secret key; and the order is a power of an integer base raised to an integer exponent, with the integer exponent being the secret key; and wherein the second verification number (s) is a ratio $$\left(\frac{h-a\cdot T_k(x)}{k}\right)$$

between a difference between the first verification number (h) and the product between the first integer (a) by the second image ($T_k(x)$), and the second integer number (k);

the second test value ($v_2$) being the image of the random number (x) through the Chebyshev map having an order that is the first verification number (h);

the recipient performing the following:

calculating an auxiliary value ($T_{T_k(x)}(T_a(x))=T_{T_k(x)a}(x)$) as an image of the second component ($T_a(x)$) of the recipient public key through the Chebyshev map having an order that is the second image ($T_k(x)$), calculating a second auxiliary value ($T_s(T_k(x))=T_{sk}(x)$) as an image of the second image ($T_k(x)$) through the Chebyshev map having an order that is the second verification number (s), and calculating the first test value ($v_1$) as the image ($T_{T_k(x)a+ks}(x)$) through the Chebyshev map of the random number (x) the order of which is the sum of the product between the first integer (a) by the second image ($T_k(x)$) and the product of the second integer (k) by the second verification number (s), by combining the first and second auxiliary values ($T_{T_k(x)a}(x)$) and ($T_{sk}(x)$) according to the formula $$v_1=T_{T_k(x)a+ks}(x)=T_{T_k(x)a}(x)\cdot T_{ks}(x)-\sqrt{(1-T_{T_k(x)a}^2(x))\cdot(1-T_{ks}^2(x))}.$$

23. An encryption process according to claim 15, wherein a recipient of a message chooses a second function as a public key, an inverse of which forms the private key, so that a corresponding chaotic map belongs to the set of permutable chaotic maps; a sender of a message encrypts an encoded message by calculating an image thereof through the chaotic map using the public key of the recipient of the message; and the recipient decrypts an encrypted message by using the private key.

24. An encryption process according to claim 23, wherein a sender performs the following:

encrypting a digital signature by calculating the image thereof through the chaotic map using a sender private key, and encrypting a message (M) together with the encrypted digital signature appended thereto, by calculating the image of the combination of the message and the encrypted digital signature through the chaotic map using a recipient public-key;

a recipient performs the following:

decrypting the received encrypted message by calculating the image thereof through the chaotic map using the recipient private key, and obtaining the digital signature by decrypting the just decrypted message by calculating the image thereof through the chaotic map using the sender public key.

25. An encryption process according to claim 24, wherein the digital signature is the message to be sent.

26. An encryption process according to claim 15, further comprising choosing an invertible parametric function defined almost everywhere on the phase space and an invertible second function defined by an integer number so that a corresponding modified chaotic map belongs to the set of permutable chaotic maps; and wherein a recipient of a message performs the following:

choosing an invertible second function so that the corresponding chaotic map belongs to the set of permutable chaotic maps, choosing a first random number and a second random number both belonging to the phase space, and calculating an image of the first random number through a recipient chaotic map having an order that is the second random number, the set formed by the first random number and an image thereof and the pre-established integer being the public-key of the recipient, the second random number being the corresponding private key;

a sender of a message performs the following:

encoding the message to be transmitted by the code, generating the first number as a non-negative integer less than the pre-established integer), choosing a third random integer less than the pre-established integer as a sender private key, calculating the image of the first random number through a sender chaotic map having an order that is the third random number, and sending to the recipient a pair of values, a first value of the pair being the image through the sender chaotic map while a second value is the image of the parametric function modulo, and the pre-established integer of the first number using as a parameter the image through the sender chaotic map of the image of the first random integer;

the recipient decrypting the message by performing the following:

calculating the image through the recipient chaotic map of the first value of the pair, obtaining the number (M) by applying the inverse of the parametric function modulo and the pre-established integer to the second value of the pair using as a parameter the image through the recipient map of the first value of the pair, and recovering the original message by decoding the number (M) with the pre-established code.

27. An encryption process according to claim 26, wherein the image of the parametric function comprises at least one of the following: a product between an argument of the function by the parameter thereof, a ratio between the argument of the function by the parameter thereof, and a sum between the argument of the function and the parameter thereof.

28. An encryption process according to claim 15, further comprising choosing an invertible second function defined by an integer number so that the corresponding modified chaotic map belongs to the set of permutable chaotic maps; and wherein a recipient of a message performs the following:

choosing a pair of random distinct prime numbers including a first p and second q prime number, choosing as the pre-established number a product of the pair of prime numbers, calculating an auxiliary number $\phi$ according to the formula $\phi=(p^2-1)(q^2-1)$, choosing a random integer e greater than one and less than the auxiliary number $\phi$, and co-prime with the auxiliary number $\phi$, calculating the recipient private key as the unique integer d greater than one and less than the auxiliary number $\phi$ that satisfies the formula $ed \equiv 1 \pmod{\phi}$, and the pair formed by the pre-established number and the random integer e being the recipient public key;

a sender of a message performs the following:

encoding the message to be transmitted by the code, generating the first number as a non-negative integer less than the pre-established integer, and sending to the recipient the image of the first number through a sender chaotic map having an order that is the random integer (e);

the recipient decrypting the message by performing the following:

obtaining the first random integer by calculating the image through a recipient chaotic map defined by the private key of the value sent by the sender, and recovering the original message by decoding the first random number with the pre-established code.

29. An encryption process comprising:

defining a public key for encrypting messages to be sent;

choosing a secret key and a set of permutable functions defined on a phase space for encrypting/decrypting messages; and choosing a code for encoding messages to be sent as a number belonging to the phase space, the set of permutable functions comprising chaotic maps generated by a composite function of first and second functions and an inverse of the first function, with the secret key being defined by the second function.

30. An encryption process according to claim 29, wherein the chaotic maps comprise Chebyshev polynomial maps.

31. An encryption process according to claim 29, wherein defining the public key comprises choosing an invertible parametric function defined almost everywhere on the phase space; and wherein a recipient of the message performs the following:

choosing an invertible second function as a recipient private key so that a corresponding chaotic map belongs to a set of permutable chaotic maps, and choosing a random number belonging to the phase space, and calculating an image of the random number through the recipient chaotic map, a pair formed by the random number and an image thereof being a recipient public-key;

a sender of the message performs the following:

encoding the message to be transmitted by the code and generating the number (M), choosing an invertible second function as a sender private key so that the corresponding chaotic map belongs to the set of permutable chaotic maps, and calculating the images of the random number through the sender chaotic map and through a combination of the recipient and sender chaotic maps, and sending to the recipient a pair or values, a first value of the pair being the image through the sender chaotic map while a second value of the pair is calculated by applying the parametric function to the number (M) using as a parameter the image through a combination of the recipient and sender chaotic maps;

the recipient decrypting the message by performing the following:

calculating the image through the recipient chaotic map of the first value of the pair, obtaining the number (M) and applying an inverse of the parametric function to the second value of the pair using as a parameter the image through the recipient chaotic map of the first value of the pair, and recovering the original message by decoding the number (M) with the pre-established code.

32. An encryption process according to claim 31, wherein the image of the parametric function comprises at least one of the following: a product between an argument of the function by the parameter thereof, a ratio between the argument of the function by the parameter thereof, and a sum between the argument of the function and the parameter thereof.

33. An encryption process according to claim 31, wherein a sender performs the following operations:

generating a public key, with a first integer number (a) being the order of the chaotic map ($T_a(.)$), generating a second integer number (k) and calculating a second image of the random number (x) through the chaotic map ($T_k(.)$) having an order that is the second integer number (k), generating a verification number (h), choosing a first test function $V_1(.)$, a second test function $V_2(.)$ and a third test function $H(.)$ such that $$V_1(T_a(x),T_k(x),H(h,T_k(x),k,a),x)=V_2(h,T_k(x),H(h,T_k(x),k,a),x);$$

generating a second verification number (s) according to the formula $$s=H(h,T_k(x),k,a),$$

sending the pair ($T_k(x)$, s) formed by the second image ($T_k(x)$) and the second verification number (s) as a signature of a message (M); a recipient performs the following operations:

obtaining an authentic sender public key (x, $T_a(x)$);

calculating a first test value ($v_1$) using the first test function $V_1(.)$ according to the formula $$v_1=V_1(T_a(x),T_k(x),s,x),$$

calculating a second test value ($v_2$) using the second test function $V_2(.)$ and the verification number (h) according to the formula $$v_2=V_2(h,T_k(x),s,x), \text{ and}$$

verifying whether the test values first ($v_1$) and second ($v_2$) are identical.

34. An encryption process according to claim 33, further comprising choosing a hash function (h(.)) defined on the phase space, wherein the first verification number (h) is the image of the message (M) through the hash function (h(.)).

35. An encryption process according to claim 29, wherein a recipient of a message chooses a second function as a public key, an inverse of which forms the private key, so that a corresponding chaotic map belongs to the set of permutable chaotic maps; a sender of a message encrypts an encoded message by calculating an image thereof through the chaotic map using the public key of the recipient of the message; and the recipient decrypts an encrypted message by using the private key.

36. An encryption process according to claim 29, further comprising choosing an invertible parametric function defined almost everywhere on the phase space and an invertible second function defined by an integer number so that a corresponding modified chaotic map belongs to the set of permutable chaotic maps; and wherein a recipient of a message performs the following:

choosing an invertible second function so that the corresponding chaotic map belongs to the set of permutable chaotic maps, choosing a first random number and a second random number both belonging to the phase space, and calculating an image of the first random number through a recipient chaotic map having an order that is the second random number, the set formed by the first random number and an image thereof and the pre-established integer being the public-key of the recipient, the second random number being the corresponding private key;

a sender of a message performs the following:

encoding the message to be transmitted by the code, generating the first number as a non-negative integer less than the pre-established integer), choosing a third random integer less than the pre-established integer as a sender private key, calculating the image of the first random number through a sender chaotic map having an order that is the third random number, and sending to the recipient a pair of values, a first value of the pair being the image through the sender chaotic map while a second value is the image of the parametric function modulo, and the pre-established integer of the first number using as a parameter the image through the sender chaotic map of the image of the first random integer;

the recipient decrypting the message by performing the following:

calculating the image through the recipient chaotic map of the first value of the pair, obtaining the number (M) by applying the inverse of the parametric function modulo and the pre-established integer to the second value of the pair using as a parameter the image through the recipient map of the first value of the pair, and recovering the original message by decoding the number (M) with the pre-established code.

37. An encryption process according to claim 36, wherein the image of the parametric function comprises at least one of the following: a product between an argument of the function by the parameter thereof, a ratio between the argument of the function by the parameter thereof, and a sum between the argument of the function and the parameter thereof.

38. An encryption process according to claim 29, further comprising choosing an invertible second function defined by an integer number so that the corresponding modified chaotic map belongs to the set of permutable chaotic maps; and wherein a recipient of a message performs the following:

choosing a pair of random distinct prime numbers including a first p and second q prime number, choosing as the pre-established number a product of the pair of prime numbers, calculating an auxiliary number $\phi$ according to the formula $\phi=(p^2-1)(q^2-1)$, choosing a random integer e greater than one and less than the auxiliary number $\phi$, and co-prime with the auxiliary number $\phi$, calculating the recipient private key as the unique integer d greater than one and less than the auxiliary number $\phi$ that satisfies the formula ed≡1(mod $\phi$), and the pair formed by the pre-established number and the random integer e being the recipient public key;

a sender of a message performs the following:

encoding the message to be transmitted by the code, generating the first number as a non-negative integer less than the pre-established integer, and sending to the recipient the image of the first number through a sender chaotic map having an order that is the random integer (e);

the recipient decrypting the message by performing the following:

obtaining the first random integer by calculating the image through a recipient chaotic map defined by the private key of the value sent by the sender, and recovering the original message by decoding the first random number with the pre-established code.

39. A computer readable medium having stored thereon a data structure comprising:

a first data field for choosing a secret key and a set of permutable functions defined on a phase space for encrypting/decrypting messages; and a second data field for choosing a code for encoding messages to be sent as a number belonging to the phase space, the set of permutable functions comprising chaotic maps generated by a composite function of first and second functions and an inverse of the first function, with the secret key being defined by the second function.

40. A computer readable medium according to claim 39, wherein the chaotic maps comprise Chebyshev polynomial maps having an order that is an integer greater than or equal to 2 and the phase space is an interval, with the order being the secret key.

41. A computer readable medium according to claim 39, wherein the chaotic maps comprise Chebyshev polynomial maps, and an order of the Chebyshev polynomial maps is a power of an integer base raised to an integer exponent, with the integer exponent being the secret key.

42. A computer readable medium according to claim 39, wherein the chaotic maps comprise a combination of Chebyshev polynomial maps and powers, defined by the formula $$\cos \lfloor (\cos^{-1}(y)+2)^p-2 \rfloor$$

with the parameter (p) being an integer greater than or equal to 2, and the phase space being an interval [−1, 1].

43. A computer readable medium according to claim 39, wherein the chaotic maps are defined by the formula $$[(y+1)^p-1]\mod 1$$

with the parameter (p) being an integer greater than or equal to 2, and the phase space being an interval [0, 1].

44. A computer readable medium according to claim 39, wherein the chaotic maps are modified chaotic maps generated by a composite function, an image of which is a calculated modulo that is a pre-established integer.

45. A computer readable medium according to claim 44, wherein the chaotic maps are equivalent to respective torus automorphisms defined as modular iterative vector maps, and an integer value of a state vector is obtained after a certain number of iteration steps by performing the following:

a third data field for calculating a dot product between a value of the state vector at a previous step and a certain matrix having a determinant that is ±1; and a fourth data field for calculating an integer remainder of the dot product modulo that is the pre-established integer.

46. A computer readable medium according to claim 39, further comprising:

a sender sending a message by performing the following:

using a third data field choosing an invertible second function as a sender private key so that a corresponding chaotic map belongs to the set of permutable chaotic maps, and using a fourth data field encrypting an encoded message to be sent by calculating an image thereof through the chaotic map using the sender private key;

a recipient receiving the encrypted message and performing the following:

using a fifth data field choosing an invertible second function as a recipient private key so that a corresponding chaotic map belongs to the set of permutable chaotic maps, using a sixth data field encrypting the received encrypted message by calculating the image thereof through the chaotic map using the recipient private key, and using a seventh data field sending back to the sender the twice encrypted message;

the sender receiving the twice encrypted message and performs the following:

using an eighth data field decrypting the twice encrypted message using the sender first private key, and using a ninth data field sending the resulting encrypted message to the recipient; and the recipient obtains the original message by decrypting the received encrypted message using the recipient private key.

47. A computer readable medium according to claim 39, comprising additional data fields for defining a public key for encrypting messages to be sent.

48. A computer readable medium according to claim 47, wherein defining the public key comprises using a third data field for choosing an invertible parametric function defined almost everywhere on the phase space; and wherein a recipient of a message performs the following:

using a fourth data field for choosing an invertible second function as a recipient private key so that a corresponding chaotic map belongs to a set of permutable chaotic maps, and using a fifth data field for choosing a random number belonging to the phase space, and using a sixth data field for calculating an image of the random number through the recipient chaotic map, a pair formed by the random number and an image thereof being a recipient public-key;

a sender of a message performs the following:

using a seventh data field for encoding the message to be transmitted by the code and generating the number (M), using an eight data field for choosing an invertible second function as a sender private key so that the corresponding chaotic map belongs to the set of permutable chaotic maps, and using a ninth data field for calculating the images of the random number through the sender chaotic map and through a combination of the recipient and sender chaotic maps, and using a tenth data field for sending to the recipient a pair or values, a first value of the pair being the image through the sender chaotic map while a second value of the pair is calculated by applying the parametric function to the number (M) using as a parameter the image through a combination of the recipient and sender chaotic maps;

the recipient decrypting the message by performing the following:

using an eleventh data field for calculating the image through the recipient chaotic map of the first value of the pair, using a twelfth data field for obtaining the number (M) and applying an inverse of the parametric function to the second value of the pair using as a parameter the image through the recipient chaotic map of the first value of the pair, and using a thirteenth data field for recovering the original message by decoding the number (M) with the pre-established code.

* * * * *

UNITED STATES PATENT AND TRADEMARK OFFICE
CERTIFICATE OF CORRECTION

PATENT NO. : 6,892,940 B2
DATED : May 17, 2005
INVENTOR(S) : Kocarev et al.

It is certified that error appears in the above-identified patent and that said Letters Patent is hereby corrected as shown below:

Title page,
Item [56], References Cited, U.S. PATENT DOCUMENTS, delete

| | | | | |
|---|---|---|---|---|
| "4,636,622 A | * | 1/1987 | Clark | 235/380 |
| 5,354,974 A | * | 10/1994 | Eisenberg | 235/379 |
| 5,610,688 A | * | 3/1997 | Inamoto et al. | 399/366 |
| 5,850,076 A | * | 12/1998 | Morioka et al. | 235/379 |
| 5,869,822 A | * | 2/1999 | Meadows et al. | 235/380 |
| 6,193,152 B1 | * | 2/2001 | Fernando et al. | 235/380 |
| 6,266,647 B1 | * | 7/2001 | Fernandez | 705/14 |
| 6,270,011 B1 | * | 8/2001 | Gottfried | 235/379 |
| 6,793,134 B2 | * | 9/2004 | Clark | 235/379 |
| 2001/0029488 A1 | * | 10/2001 | Takeshima et al. | 705/41". |

FOREIGN PATENT DOCUMENTS, delete

| | | | | |
|---|---|---|---|---|
| "JP | 06266954 A | * | 9/1994 | G07G/1/00 |
| JP | 10171573 A | * | 6/1998 | G06F/3/02 |
| JP | 11194892 A | * | 7/1999 | G06F/3/02". |

Column 2,
Line 50, delete "are crucial" insert -- are of crucial --.

Column 7,
Line 61, delete "$T_s(y) = T_{s_1}(\cdots T_{s_1} \cdots T_{s_i} \cdots T_{s_i}(y)))\quad (5)$" insert -- $T_s(y) = T_{s_1}(\cdots T_{s_1} \cdots T_{s_i} \cdots T_{s_i}(y))\quad (5)$ --.

Column 14,
Line 7, delete "is" insert -- be --.
Line 33, delete "referred as" insert -- referred to as --.

Column 20,
Line 18, delete "referred as" insert -- referred to as --.

Column 22,
Line 28, delete "which is divides" insert -- which divides --.

Column 23,
Line 28, delete "Uisng" insert -- Using --.

UNITED STATES PATENT AND TRADEMARK OFFICE
CERTIFICATE OF CORRECTION

PATENT NO. : 6,892,940 B2
DATED : May 17, 2005
INVENTOR(S) : Kocarev et al.

It is certified that error appears in the above-identified patent and that said Letters Patent is hereby corrected as shown below:

Column 25,
Line 32, delete "$\lfloor (y+1)^P - \rfloor 1\text{mod}1$" insert -- $[(y+1)^P - 1]\text{ mod}1$ --.

Column 26,
Line 62, delete "pair or values" insert -- pair of values --.

Column 31,
Line 7, delete "pair or values" insert -- pair of values --.

Column 35,
Line 10, delete "eight" insert -- eighth --.
Line 20, delete "or values" insert -- of values --.

Signed and Sealed this

Fifteenth Day of November, 2005

JON W. DUDAS
*Director of the United States Patent and Trademark Office*